US010176701B2

(12) United States Patent
Cruver et al.

(10) Patent No.: US 10,176,701 B2
(45) Date of Patent: *Jan. 8, 2019

(54) AUTOMATED RESPONSE TO DURESS IN DISTRESS SIGNALS

(71) Applicant: Alert Media, Inc., Austin, TX (US)

(72) Inventors: Brian Cruver, Austin, TX (US); David Godwin, Austin, TX (US); Jeff Branc, Austin, TX (US); Matthew Miller, Austin, TX (US)

(73) Assignee: Alert Media, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/796,291

(22) Filed: Oct. 27, 2017

(65) Prior Publication Data
US 2018/0053399 A1 Feb. 22, 2018

Related U.S. Application Data

(63) Continuation of application No. 15/252,788, filed on Aug. 31, 2016, now Pat. No. 9,870,695, which is a
(Continued)

(51) Int. Cl.
*G08B 21/02* (2006.01)
*G08B 25/01* (2006.01)
(Continued)

(52) U.S. Cl.
CPC ........... *G08B 25/016* (2013.01); *G08B 25/10* (2013.01); *H04M 1/72527* (2013.01);
(Continued)

(58) Field of Classification Search
CPC ..... G08B 25/016; G08B 25/10; H04W 12/08; H04W 88/02; H04W 4/02; H04W 4/22;
(Continued)

(56) References Cited

U.S. PATENT DOCUMENTS 9,390,614 B2 * 7/2016 Cruver .................... H04W 4/90
9,483,931 B2 * 11/2016 Cruver .................... H04W 4/90
(Continued)

*Primary Examiner* — Daniel Previl
(74) *Attorney, Agent, or Firm* — Dickinson Wright PLLC

(57) ABSTRACT

A system for facilitating automated response to a distress signal includes an attachment for a multifunction mobile computing device. In some embodiments, the attachment removably articulates to a sensor location coupled to a housing of the multifunction mobile computing device. In some embodiments, the system includes a computer program product in a non-transitory computer-readable medium. In some embodiments, the program instructions are computer-executable by the multifunction mobile computing device to implement detecting a disarticulation of the attachment from the sensor location on the multifunction mobile computing device, and, responsive to the detecting the disarticulation of the attachment from the sensor location on the multifunction mobile computing device, transmitting to a distress signal response receiver over a radio-frequency network from a radio-frequency transmitter located within a housing of the multifunction mobile computing device the distress signal.

20 Claims, 21 Drawing Sheets

Related U.S. Application Data continuation of application No. 15/179,207, filed on Jun. 10, 2016, now Pat. No. 9,483,931, which is a continuation of application No. 14/886,552, filed on Oct. 19, 2015, now Pat. No. 9,390,614.

(60) Provisional application No. 62/065,378, filed on Oct. 17, 2014.

(51) Int. Cl.

| | |
|---|---|
| *G08B 25/10* | (2006.01) |
| *H04W 4/90* | (2018.01) |
| *H04W 12/08* | (2009.01) |
| *H04M 1/725* | (2006.01) |
| *H04W 4/02* | (2018.01) |
| *H04W 88/02* | (2009.01) |

(52) U.S. Cl.
CPC ... *H04M 1/72538* (2013.01); *H04M 1/72541* (2013.01); *H04W 4/02* (2013.01); *H04W 4/90* (2018.02); *H04W 12/08* (2013.01); *H04W 88/02* (2013.01)

(58) Field of Classification Search
CPC ............... H04W 4/90; H04M 1/72527; H04M 1/72538; H04M 1/72541
USPC ........ 340/573.1, 539.11, 500, 426.12, 573.4, 340/573.5, 692, 691.7, 825.25, 825.24, 340/7.5
See application file for complete search history.

(56) References Cited

U.S. PATENT DOCUMENTS

| | | | |
|---|---|---|---|
| 9,870,695 B2* | 1/2018 | Cruver | ..................... H04W 4/90 |
| 2005/0135570 A1* | 6/2005 | Binning | .............. H04L 12/2803 379/45 |
| 2007/0085993 A1* | 4/2007 | Brown, Jr. | ............... G01C 3/00 356/3 |
| 2008/0122609 A1* | 5/2008 | Mannisto | ............. G08B 19/005 340/500 |
| 2012/0192600 A1* | 8/2012 | Johnston | ................. A47F 7/024 70/58 |
| 2012/0196556 A1* | 8/2012 | Perrott | ................. G08B 27/001 455/404.1 |
| 2013/0241725 A1* | 9/2013 | Cancio | ..................... B60Q 7/00 340/473 |
| 2013/0241728 A1* | 9/2013 | Spector | ............. G08B 21/0453 340/539.12 |

* cited by examiner

AUTOMATED RESPONSE TO DURESS IN DISTRESS SIGNALS

This application claims priority from and is a continuation of U.S. patent application Ser. No. 15/179,207, filed Jun. 10, 2016, which claims priority from and is a continuation of U.S. patent application Ser. No. 14/886,552, filed Oct. 19, 2015, which claims benefit of priority to U.S. Provisional Application No. 62/065,378, filed Oct. 17, 2014, titled "System and Method for Automated Response to Distress Signal," each of which is hereby incorporated by reference herein in their entirety.

BACKGROUND

Technical Field

This disclosure relates generally to emergency response, and, more specifically, to enabling response to distress signals sent by individuals.

Description of the Related Art

Current technology for summoning help in the event of an emergency relies on the ability of a user of the technology to "dial 911," which is to say that a user of the technology must secure access to a telephone, unlock the telephone, correctly enter a telephone number to summon help, and then describe the situation to a dispatch operator on the other end of the call.

In emergencies in the real world, the time and capacity necessary to perform all of these operations are generally not available to persons subject to the emergency during the course of the emergency. Simply put, a user has neither the time nor the concentration to "unlock, dial, and beg for help" while being threatened with violence. In the case of medical emergencies, the user may further lack capacity to "unlock, dial, and beg for help" as he or she teeters on the border of lost consciousness. The paradigm of "unlock, dial, and beg for help" works for some people in some situations, but the real emergencies faced by many people, particularly people field-deployed to dangerous situations, are not well-served.

SUMMARY OF EMBODIMENTS

A peripheral device for use in causing a multifunction mobile computing device to facilitate automated response to a distress signal includes an attachment for a multifunction mobile computing device. In some embodiments, the attachment removably articulates to a sensor location coupled to the housing of the multifunction mobile computing device. In some embodiments, the attachment removably articulates to a sensor location in a manner detectable to a sensor housed at the sensor location. In some embodiments, the peripheral device includes a tether for removably articulating the attachment to a user of the multifunction mobile computing device. In some embodiments, upon application of force to the tether in a direction away from the sensor location, the sensor housed at the sensor location detects removal of the attachment.

Figure 1:
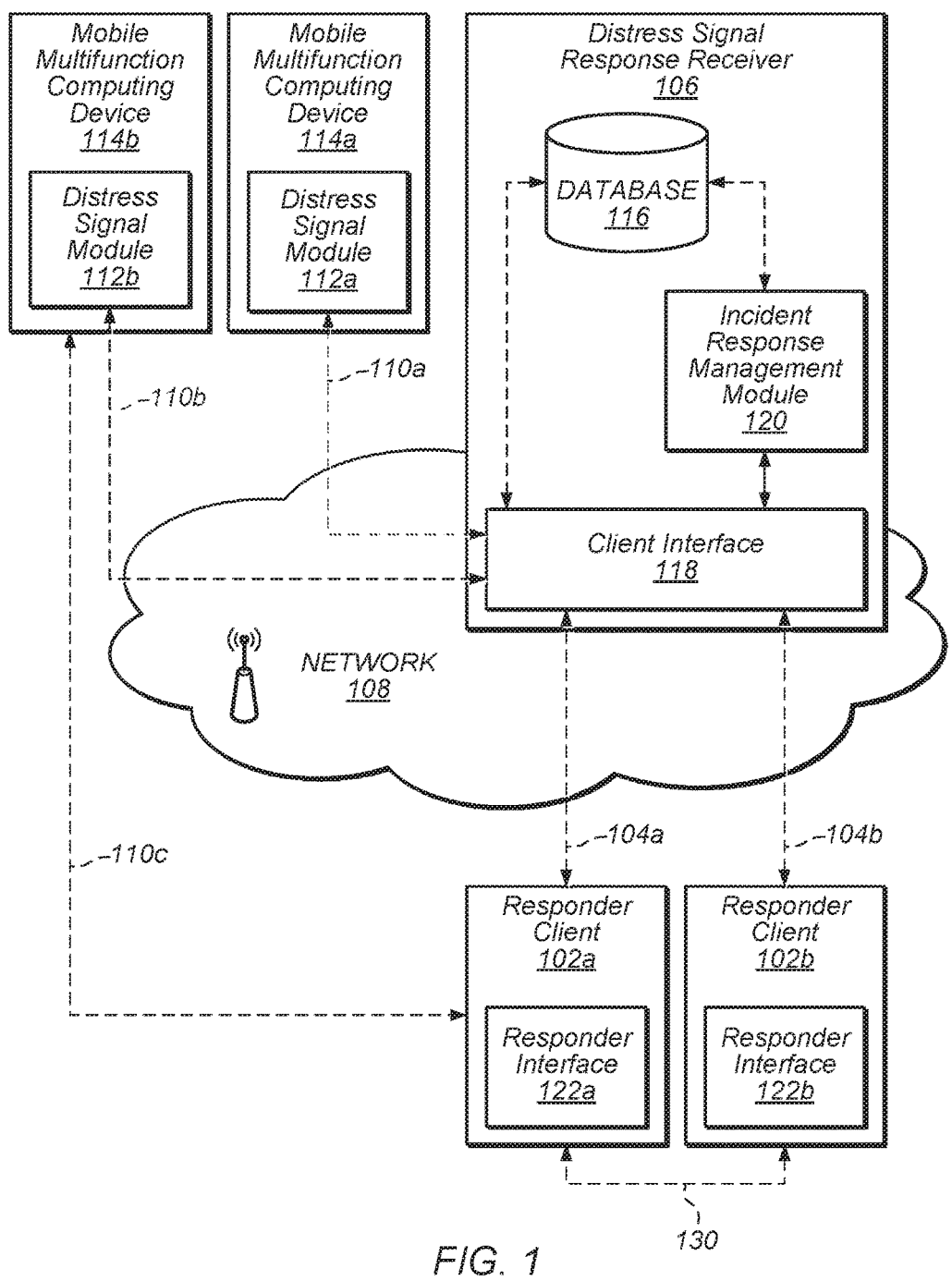
FIG. 1 depicts an ecosystem for facilitating automated response to a distress signal, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Various embodiments of a system and method for facilitating automated response to a distress signal are disclosed. Some embodiments include a peripheral device for use in causing a multifunction mobile computing device to facilitate automated response to a distress signal includes an attachment for a multifunction mobile computing device. In some embodiments, the attachment removably articulates to a sensor location coupled to the housing of the multifunction mobile computing device. In some embodiments, the attachment removably articulates to a sensor location in a manner detectable to a sensor housed at the sensor location. In some embodiments, the peripheral device includes a tether for removably articulating the attachment to a user of the multifunction mobile computing device. In some embodiments, upon application of force to the tether in a direction away from the sensor location, the sensor housed at the sensor location detects removal of the attachment and causes the multifunction mobile computing device to transmit a distress signal.

In some embodiments, the sensor location includes an audio output connector coupled to a housing of the multifunction mobile computing device, and the attachment includes an articulating component dimensioned for removable articulation to the audio output connector.

In some embodiments, the sensor location includes an audio output connector coupled to a housing of the multifunction mobile computing device, and the attachment includes an electrically-conductive articulating component dimensioned for removable articulation to the audio output connector.

In some embodiments, the sensor location includes a digital data connector coupled to a housing of the multifunction mobile computing device, and the attachment includes an articulating component dimensioned for removable articulation to the digital data connector.

In some embodiments, the sensor location includes a magnetic peripheral articulation connector coupled to a housing of the multifunction mobile computing device, and the attachment includes an articulating component polarized for magnetic removable articulation to the magnetic peripheral articulation connector.

In some embodiments, the sensor location includes an electric power transmission connector coupled to a housing of the multifunction mobile computing device, and the attachment includes an articulating component dimensioned for removable articulation to the electric power transmission connector.

In some embodiments, the sensor location includes a radio frequency antennae coupled to a housing of the multifunction mobile computing device, the attachment includes an electronic device having a data connection to the sensor location via a radio frequency channel between the attachment and the multifunction mobile computing device, and the disarticulation includes an attenuation of the data connection.

In some embodiments, the sensor location includes a radio frequency antennae coupled to a housing of the multifunction mobile computing device, the attachment includes an electronic device having a data connection to the sensor location via a radio frequency channel between the attachment and the multifunction mobile computing device, and the disarticulation includes a loss of the data connection.

Various embodiments of a system and method for facilitating automated response to a distress signal are disclosed. In some embodiments, a system for facilitating automated response to a distress signal includes an attachment for a multifunction mobile computing device. In some embodiments, the attachment removably articulates to a sensor location coupled to a housing of the multifunction mobile computing device. In some embodiments, the system includes a computer program product in a non-transitory computer-readable medium. In some embodiments, the program instructions are computer-executable by the multifunction mobile computing device to implement detecting a disarticulation of the attachment from the sensor location on the multifunction mobile computing device, and, responsive to the detecting the disarticulation of the attachment from the sensor location on the multifunction mobile computing device, transmitting to a distress signal response receiver over a radio-frequency network from a radio-frequency transmitter located within a housing of the multifunction mobile computing device the distress signal.

Some embodiments present a toggle control to allow a user to prevent the transmission of a distress signal after detachment of the attachment or to cause transmission of an 'all clear' to cancel a distress signal. In some embodiments, the program instructions are further computer-executable to implement, responsive to the detecting the disarticulation of the attachment from the sensor location on the multifunction mobile computing device, presenting a distress signal control interface capable of receiving an order from a user of the multifunction mobile computing device to prevent transmission of the distress signal, and, responsive to the order from a user of the multifunction mobile computing device to prevent transmission of the distress signal, preventing transmission of the distress signal or broadcasting an all-clear signal.

Some embodiments include the ability to transmit or block transmission of a distress signal on a multifunction mobile computing device in spite of the 'locked screen' condition of on the multifunction mobile computing device. In some embodiments, the program instructions are further computer-executable to implement, responsive to the detecting the disarticulation of the attachment from the sensor location on the multifunction mobile computing device, over-riding a locked screen condition of the multifunction mobile computing device, and presenting a distress signal control interface capable of receiving an order from a user of the multifunction mobile computing device to control parameters of transmission of the distress signal.

Some embodiments present a data-entry interface. In some embodiments, wherein the program instructions are further computer-executable to implement, responsive to the detecting the disarticulation of the attachment from the sensor location on the multifunction mobile computing device, over-riding a locked screen condition of the multifunction mobile computing device, and presenting a distress signal data input interface capable of receiving condition description indications from a user of the multifunction mobile computing device for transmission with the distress signal.

Some embodiments support user entry of duress codes. In some embodiments, the program instructions are further computer-executable to implement, responsive to the detecting the disarticulation of the attachment from the sensor location on the multifunction mobile computing device, presenting a distress signal control interface capable of receiving an order from a user of the multifunction mobile computing device to prevent transmission of the distress signal. In some embodiments, the presenting the distress signal control interface capable of receiving the order from a user of the multifunction mobile computing device to prevent transmission of the distress signal further includes presenting a distress signal control interface capable of receiving a duress indication order from the user of the multifunction mobile computing device. In some embodiments, the program instructions are further computer-executable to implement, responsive to receiving the duress indication order from the user of the multifunction mobile computing device, indicating over a user interface of the multifunction mobile computing device prevention of transmission of the distress signal, and transmitting the distress signal with a duress indicator.

Some embodiments capture sensor data for transmission in conjunction with the transmission of distress signals. Non-limiting examples of such data include location data, audio, video, movement information, vital sign information, and information from third-party sensor devices affiliated with a multifunction mobile computing device. In some embodiments, the program instructions are further computer-executable to implement, responsive to the detecting the disarticulation of the attachment from the sensor location on the multifunction mobile computing device, capturing input data received from one or more sensors of the multifunction mobile computing device, and transmitting to the distress signal response receiver over the radio-frequency network from the radio-frequency transmitter located within the housing of the multifunction mobile computing device the input data received from the one or more sensors of the multifunction mobile computing device.

In some embodiments, the program instructions are further computer-executable to implement, responsive to the detecting the disarticulation of the attachment from the sensor location on the multifunction mobile computing device, capturing location data describing a location of the multifunction mobile computing device, and transmitting to the distress signal response receiver over the radio-frequency network from the radio-frequency transmitter located within the housing of the multifunction mobile computing device the location data describing the location of the multifunction mobile computing device.

In some embodiments, the program instructions are further computer-executable to implement, responsive to the detecting the disarticulation of the attachment from the sensor location on the multifunction mobile computing device, capturing input data received from one or more external sensors affiliated with the multifunction mobile computing device, and transmitting to the distress signal response receiver over the radio-frequency network from the radio-frequency transmitter located within the housing of the multifunction mobile computing device the input data received from the one or more external sensors affiliated with the multifunction mobile computing device.

In some embodiments, the program instructions are further computer-executable to implement, responsive to the detecting the disarticulation of the attachment from the sensor location on the multifunction mobile computing device, capturing audio input data received from one or more audio sensors of the multifunction mobile computing device, and transmitting to the distress signal response receiver over the radio-frequency network from the radio-frequency transmitter located within the housing of the multifunction mobile computing device the audio input data received from the one or more audio sensors of the multifunction mobile computing device.

In some embodiments, the program instructions are further computer-executable to implement, responsive to the detecting the disarticulation of the attachment from the sensor location on the multifunction mobile computing device, capturing video input data received from one or more video sensors of the multifunction mobile computing device, and transmitting to the distress signal response receiver over the radio-frequency network from the radio-frequency transmitter located within the housing of the multifunction mobile computing device the video input data received from the one or more video sensors of the multifunction mobile computing device.

In some embodiments, the program instructions are further computer-executable to implement, responsive to the detecting the disarticulation of the attachment from the sensor location on the multifunction mobile computing device, capturing motion input data received from one or more motion sensors of the multifunction mobile computing device, and transmitting to the distress signal response receiver over the radio-frequency network from the radio-frequency transmitter located within the housing of the multifunction mobile computing device the motion input data received from the one or more motion sensors of the multifunction mobile computing device.

In some embodiments, the program instructions are further computer-executable to implement, responsive to the detecting the disarticulation of the attachment from the sensor location on the multifunction mobile computing device, capturing vital sign input data received from one or more vital sign sensors reporting to the multifunction mobile computing device, and transmitting to the distress signal response receiver over the radio-frequency network from the radio-frequency transmitter located within the housing of the multifunction mobile computing device the vital sign input data received from the one or more vital sign sensors reporting to the multifunction mobile computing device.

Various embodiments allow for the attachment to connect to the sensor location of the multifunction mobile computing device in different ways without departing from the scope of the present disclosure. In some embodiments, the sensor location includes an audio output connector coupled to a housing of the multifunction mobile computing device, and the attachment includes an articulating component dimensioned for removable articulation to the audio output connector. In some embodiments, the sensor location includes an audio output connector coupled to a housing of the multifunction mobile computing device, and the attachment includes an electrically-conductive articulating component dimensioned for removable articulation to the audio output connector.

In some embodiments, the sensor location includes a digital data connector coupled to a housing of the multifunction mobile computing device, and the attachment includes an articulating component dimensioned for removable articulation to the digital data connector.

In some embodiments, the sensor location includes a magnetic peripheral articulation connector coupled to a housing of the multifunction mobile computing device, and the attachment includes an articulating component polarized for magnetic removable articulation to the magnetic peripheral articulation connector.

In some embodiments, the sensor location includes an electric power transmission connector coupled to a housing of the multifunction mobile computing device, and the attachment includes an articulating component dimensioned for removable articulation to the electric power transmission connector.

In some embodiments, the sensor location includes a radio frequency antennae coupled to a housing of the multifunction mobile computing device, the attachment includes an electronic device having a data connection to the sensor location via a radio frequency channel between the attachment and the multifunction mobile computing device, and the disarticulation includes an attenuation of the data connection.

In some embodiments, the sensor location includes a radio frequency antennae coupled to a housing of the multifunction mobile computing device, the attachment includes an electronic device having a data connection to the sensor location via a radio frequency channel between the attachment and the multifunction mobile computing device, the disarticulation includes a loss of the data connection.

In some embodiments, the sensor location includes a radio frequency antennae coupled to a housing of the multifunction mobile computing device, the attachment includes an electronic device having a data connection to the sensor location via a radio frequency channel between the attachment and the multifunction mobile computing device, and the disarticulation includes an increase in a distance between the sensor location and the attachment.

Some embodiments support the transmission of a distress signal in a 'silent alarm' mode that allows for transmission of the distress signal without notification of persons in the vicinity of the multifunction mobile computing device. In some embodiments, the program instructions computer-executable to implement transmitting to a distress signal response receiver over a radio-frequency network from a radio-frequency transmitter located within a housing of the multifunction mobile computing device the distress signal further include program instructions computer-executable to implement transmitting to a distress signal response receiver over a radio-frequency network from a radio-frequency transmitter located within a housing of the multifunction mobile computing device the distress signal without presenting any visible or audible indication of the transmission of the distress signal.

Some embodiments support the transmission of a distress signal in a 'local alert' mode that allows for transmission of the distress signal without notification of persons in the vicinity of the multifunction mobile computing device. In some embodiments, the program instructions are further computer-executable to implement, responsive to the detecting the disarticulation of the attachment from the sensor location on the multifunction mobile computing device, providing an audible indication of the transmission of the distress signal.

In some embodiments, the program instructions are further computer-executable to implement, responsive to the detecting the disarticulation of the attachment from the sensor location on the multifunction mobile computing device, providing a vibration as an indication of the transmission of the distress signal.

In some embodiments, the program instructions are further computer-executable to implement, responsive to the detecting the disarticulation of the attachment from the sensor location on the multifunction mobile computing device, providing light from a visible light source as an indication of the transmission of the distress signal.

Some embodiments include a method for facilitating automated response to a distress signal. In some embodiments, the method includes detecting a disarticulation from a sensor location on a multifunction mobile computing device of an attachment removably articulated to the sensor location, and, responsive to the detecting the disarticulation of the attachment from the sensor location on the multifunction mobile computing device, transmitting to a distress signal response receiver over a radio-frequency network from a radio-frequency transmitter located within a housing of the multifunction mobile computing device the distress signal.

In some embodiments, the method further includes responsive to the detecting the disarticulation from the sensor location on the multifunction mobile computing device of the attachment, presenting a distress signal control interface capable of receiving an order from a user of the multifunction mobile computing device to prevent transmission of the distress signal, and responsive to the order from a user of the multifunction mobile computing device to prevent transmission of the distress signal, transmitting an all-clear signal.

In some embodiments, the method further includes, responsive to the detecting the disarticulation of the attachment from the sensor location on the multifunction mobile computing device, over-riding a locked screen condition of the multifunction mobile computing device, and presenting a distress signal control interface capable of receiving an order from a user of the multifunction mobile computing device to control parameters of transmission of the distress signal.

In some embodiments, the method further includes, responsive to the detecting the disarticulation of the attachment from the sensor location on the multifunction mobile computing device, over-riding a locked screen condition of the multifunction mobile computing device, and presenting a distress signal data input interface capable of receiving an condition description indications from a user of the multifunction mobile computing device to for transmission with the distress signal.

In some embodiments, the method further includes, responsive to the detecting the disarticulation of the attachment from the sensor location on the multifunction mobile computing device, presenting a distress signal control interface capable of receiving an order from a user of the multifunction mobile computing device to present transmission of the distress signal. In some embodiments, the presenting the distress signal control interface capable of receiving the order from a user of the multifunction mobile computing device to prevent transmission of the distress signal further includes presenting a distress signal control interface capable of receiving a duress indication order from the user of the multifunction mobile computing device. In some embodiments, the method further includes responsive to receiving the duress indication order from the user of the multifunction mobile computing device, indicating over a user interface of the multifunction mobile computing device prevention of transmission of the distress signal, and transmitting the distress signal with a duress indicator.

In some embodiments, the method further includes, responsive to the detecting the disarticulation of the attachment from the sensor location on the multifunction mobile computing device, capturing input data received from one or more sensors of the multifunction mobile computing device, and transmitting to the distress signal response receiver over the radio-frequency network from the radio-frequency transmitter located within the housing of the multifunction mobile computing device the input data received from the one or more sensors of the multifunction mobile computing device.

In some embodiments, the method further includes, responsive to the detecting the disarticulation of the attachment from the sensor location on the multifunction mobile computing device, capturing location data describing a location of the multifunction mobile computing device, and transmitting to the distress signal response receiver over the radio-frequency network from the radio-frequency transmitter located within the housing of the multifunction mobile computing device the location data describing the location of the multifunction mobile computing device.

In some embodiments, the method further includes responsive to the detecting the disarticulation of the attachment from the sensor location on the multifunction mobile computing device, capturing input data received from one or more external sensors affiliated with the multifunction mobile computing device, and transmitting to the distress signal response receiver over the radio-frequency network from the radio-frequency transmitter located within the housing of the multifunction mobile computing device the input data received from the one or more external sensors affiliated with the multifunction mobile computing device.

In some embodiments, the method further includes, responsive to the detecting the disarticulation of the attachment from the sensor location on the multifunction mobile computing device, capturing audio input data received from one or more audio sensors of the multifunction mobile computing device, and transmitting to the distress signal response receiver over the radio-frequency network from the radio-frequency transmitter located within the housing of the multifunction mobile computing device the audio input data received from the one or more audio sensors of the multifunction mobile computing device.

In some embodiments, the method further includes, responsive to the detecting the disarticulation of the attachment from the sensor location on the multifunction mobile computing device, capturing video input data received from one or more video sensors of the multifunction mobile computing device, and transmitting to the distress signal response receiver over the radio-frequency network from the radio-frequency transmitter located within the housing of the multifunction mobile computing device the video input data received from the one or more video sensors of the multifunction mobile computing device.

In some embodiments, the method further includes, responsive to the detecting the disarticulation of the attachment from the sensor location on the multifunction mobile computing device, capturing motion input data received from one or more motion sensors of the multifunction mobile computing device, and transmitting to the distress signal response receiver over the radio-frequency network from the radio-frequency transmitter located within the housing of the multifunction mobile computing device the motion input data received from the one or more motion sensors of the multifunction mobile computing device.

In some embodiments, the method further includes, responsive to the detecting the disarticulation of the attachment from the sensor location on the multifunction mobile computing device, capturing vital sign input data received from one or more vital sign sensors reporting to the multifunction mobile computing device, and transmitting to the distress signal response receiver over the radio-frequency network from the radio-frequency transmitter located within the housing of the multifunction mobile computing device the vital sign input data received from the one or more vital sign sensors reporting to the multifunction mobile computing device.

In some embodiments, the transmitting to a distress signal response receiver over a radio-frequency network from a radio-frequency transmitter located within a housing of the multifunction mobile computing device the distress signal further includes transmitting to a distress signal response receiver over a radio-frequency network from a radio-frequency transmitter located within a housing of the multifunction mobile computing device the distress signal without presenting any visible or audible indication of the transmission of the distress signal.

In some embodiments, the method further includes, responsive to the detecting the disarticulation of the attachment from the sensor location on the multifunction mobile computing device, providing an audible indication of the transmission of the distress signal.

In some embodiments, the method further includes, responsive to the detecting the disarticulation of the attachment from the sensor location on the multifunction mobile computing device, providing a vibration as an indication of the transmission of the distress signal.

In some embodiments, the method further includes responsive to the detecting the disarticulation of the attachment from the sensor location on the multifunction mobile computing device, providing light from a visible light source as an indication of the transmission of the distress signal.

Some embodiments include a non-transitory computer-readable storage medium including program instructions. In some embodiments, the program instructions are executable by one or more processors of a multifunction mobile computing device to cause the multifunction mobile to implement detecting a disarticulation from a sensor location on a multifunction mobile computing device of an attachment removably articulated to the sensor location, and responsive to the detecting the disarticulation of the attachment from the sensor location on the multifunction mobile computing device, transmitting to a distress signal response receiver over a radio-frequency network from a radio-frequency transmitter located within a housing of the multifunction mobile computing device the distress signal.

In some embodiments, the program instructions are executable by one or more processors of a multifunction mobile computing device to cause the multifunction mobile to implement responsive to the detecting the disarticulation from the sensor location on the multifunction mobile computing device of the attachment, presenting a distress signal control interface capable of receiving an order from a user of the multifunction mobile computing device to prevent transmission of the distress signal, and responsive to the order from a user of the multifunction mobile computing device to prevent transmission of the distress signal, preventing transmission of the distress signal.

In some embodiments, the program instructions are executable by one or more processors of a multifunction mobile computing device to cause the multifunction mobile to implement, responsive to the detecting the disarticulation of the attachment from the sensor location on the multifunction mobile computing device, over-riding a locked screen condition of the multifunction mobile computing device, and presenting a distress signal control interface capable of receiving an order from a user of the multifunction mobile computing device to control parameters of transmission of the distress signal.

In some embodiments, the program instructions are executable by one or more processors of a multifunction mobile computing device to cause the multifunction mobile to implement, responsive to the detecting the disarticulation of the attachment from the sensor location on the multifunction mobile computing device, over-riding a locked screen condition of the multifunction mobile computing device, and presenting a distress signal data input interface capable of receiving an condition description indications from a user of the multifunction mobile computing device to for transmission with the distress signal.

In some embodiments, the program instructions are executable by one or more processors of a multifunction mobile computing device to cause the multifunction mobile to implement, responsive to the detecting the disarticulation of the attachment from the sensor location on the multifunction mobile computing device, presenting a distress signal control interface capable of receiving an order from a user of the multifunction mobile computing device to present transmission of the distress signal. In some embodiments, the program instructions executable by the one or more processors of the multifunction mobile computing device to cause the multifunction mobile to implement presenting the distress signal control interface capable of receiving the order from a user of the multifunction mobile computing device to prevent transmission of the distress signal further include program instructions executable by the one or more processors of the multifunction mobile computing device to cause the multifunction mobile to implement presenting a distress signal control interface capable of receiving a duress indication order from the user of the multifunction mobile computing device. In some embodiments, the program instructions are executable by one or more processors of a multifunction mobile computing device to cause the multifunction mobile to implement, responsive to receiving the duress indication order from the user of the multifunction mobile computing device, indicating over a user interface of the multifunction mobile computing device prevention of transmission of the distress signal, and transmitting the distress signal with a duress indicator.

In some embodiments, the program instructions are executable by one or more processors of a multifunction mobile computing device to cause the multifunction mobile to implement, responsive to the detecting the disarticulation of the attachment from the sensor location on the multifunction mobile computing device, capturing input data received from one or more sensors of the multifunction mobile computing device, and transmitting to the distress signal response receiver over the radio-frequency network from the radio-frequency transmitter located within the housing of the multifunction mobile computing device the input data received from the one or more sensors of the multifunction mobile computing device.

In some embodiments, the program instructions are executable by one or more processors of a multifunction mobile computing device to cause the multifunction mobile to implement, responsive to the detecting the disarticulation of the attachment from the sensor location on the multifunction mobile computing device, capturing location data describing a location of the multifunction mobile computing device, and transmitting to the distress signal response receiver over the radio-frequency network from the radio-frequency transmitter located within the housing of the multifunction mobile computing device the location data describing the location of the multifunction mobile computing device.

In some embodiments, the program instructions are executable by one or more processors of a multifunction mobile computing device to cause the multifunction mobile to implement, responsive to the detecting the disarticulation of the attachment from the sensor location on the multifunction mobile computing device, capturing input data received from one or more external sensors affiliated with the multifunction mobile computing device, and transmitting to the distress signal response receiver over the radio-frequency network from the radio-frequency transmitter located within the housing of the multifunction mobile computing device the input data received from the one or more external sensors affiliated with the multifunction mobile computing device.

In some embodiments, the program instructions are executable by one or more processors of a multifunction mobile computing device to cause the multifunction mobile to implement, responsive to the detecting the disarticulation of the attachment from the sensor location on the multifunction mobile computing device, capturing audio input data received from one or more audio sensors of the multifunction mobile computing device, and transmitting to the distress signal response receiver over the radio-frequency network from the radio-frequency transmitter located within the housing of the multifunction mobile computing device the audio input data received from the one or more audio sensors of the multifunction mobile computing device.

In some embodiments, the program instructions are executable by one or more processors of a multifunction mobile computing device to cause the multifunction mobile to implement responsive to the detecting the disarticulation of the attachment from the sensor location on the multifunction mobile computing device, capturing video input data received from one or more video sensors of the multifunction mobile computing device, and transmitting to the distress signal response receiver over the radio-frequency network from the radio-frequency transmitter located within the housing of the multifunction mobile computing device the video input data received from the one or more video sensors of the multifunction mobile computing device.

In some embodiments, the program instructions are executable by one or more processors of a multifunction mobile computing device to cause the multifunction mobile to implement, responsive to the detecting the disarticulation of the attachment from the sensor location on the multifunction mobile computing device, capturing motion input data received from one or more motion sensors of the multifunction mobile computing device, and transmitting to the distress signal response receiver over the radio-frequency network from the radio-frequency transmitter located within the housing of the multifunction mobile computing device the motion input data received from the one or more motion sensors of the multifunction mobile computing device.

In some embodiments, the program instructions are executable by one or more processors of a multifunction mobile computing device to cause the multifunction mobile to implement, responsive to the detecting the disarticulation of the attachment from the sensor location on the multifunction mobile computing device, capturing vital sign input data received from one or more vital sign sensors reporting to the multifunction mobile computing device, and transmitting to the distress signal response receiver over the radio-frequency network from the radio-frequency transmitter located within the housing of the multifunction mobile computing device the vital sign input data received from the one or more vital sign sensors reporting to the multifunction mobile computing device.

In some embodiments, the program instructions executable by the one or more processors of the multifunction mobile computing device to cause the multifunction mobile to implement transmitting to a distress signal response receiver over a radio-frequency network from a radio-frequency transmitter located within a housing of the multifunction mobile computing device the distress signal further include program instructions executable by the one or more processors of the multifunction mobile computing device to cause the multifunction mobile to implement transmitting to a distress signal response receiver over a radio-frequency network from a radio-frequency transmitter located within a housing of the multifunction mobile computing device the distress signal without presenting any visible or audible indication of the transmission of the distress signal.

In some embodiments, the program instructions are executable by one or more processors of a multifunction mobile computing device to cause the multifunction mobile to implement, responsive to the detecting the disarticulation of the attachment from the sensor location on the multifunction mobile computing device, providing an audible indication of the transmission of the distress signal.

In some embodiments, the program instructions are executable by one or more processors of a multifunction mobile computing device to cause the multifunction mobile to implement, responsive to the detecting the disarticulation of the attachment from the sensor location on the multifunction mobile computing device, providing a vibration as an indication of the transmission of the distress signal.

In some embodiments, the program instructions are executable by one or more processors of a multifunction mobile computing device to cause the multifunction mobile to implement, responsive to the detecting the disarticulation of the attachment from the sensor location on the multifunction mobile computing device, providing light from a visible light source as an indication of the transmission of the distress signal.

Some embodiments include a system for facilitating automated response to a distress signal. In some embodiments, the system includes a network monitoring module configured for monitoring signals received over a data network for a presence of one or more distress signals transmitted over a radio-frequency network from a radio-frequency transmitter located within a housing of a multifunction mobile computing device responsive to detecting a disarticulation of an attachment from a sensor location on a multifunction mobile computing device, and an assessment module configured for assessing priority of the one or more distress signals transmitted over the radio-frequency network from the radio-frequency transmitter located within the housing of a multifunction mobile computing device responsive to detecting the disarticulation of an attachment from the sensor location on the multifunction mobile computing device, and a resource response module configured for communicating the distress signals to resources tasked to respond to the distress signals.

In some embodiments, the system includes a logging module configured for receiving condition description indications from a user of the multifunction mobile computing device to for transmission with the distress signal. In some embodiments, the system includes a real-time communication module configured for communicating response condition description indications to a user of the multifunction mobile computing device in response to the distress signal, and receiving condition description indications from a user of the multifunction mobile computing device to for transmission with the distress signal.

In some embodiments, the system includes a response instruction communication module configured for communicating response instructions to a user of the multifunction mobile computing device in response to the distress signal. In some embodiments, the system includes a responder update diffusion module configured for communicating to the resources tasked to respond to the distress signals sensor information gathered from the multifunction mobile computing device in response to the distress signal.

In some embodiments, the system includes an analytics module configured for assessing patterns in multiple distress signals and selecting appropriate responses to one or more distress signals. In some embodiments, the system includes a responder instruction module configured for communicating to the resources tasked to respond to the distress signals automated instructions selected based on sensor information gathered from the multifunction mobile computing device in response to the distress signal.

Some embodiments include a method for facilitating automated response to a distress signal. In some embodiments, the method includes monitoring signals received over a data network for a presence of one or more distress signals transmitted over a radio-frequency network from a radio-frequency transmitter located within a housing of a multifunction mobile computing device responsive to detecting a disarticulation of an attachment from a sensor location on a multifunction mobile computing device, assessing priority of the one or more distress signals transmitted over the radio-frequency network from the radio-frequency transmitter located within the housing of a multifunction mobile computing device responsive to detecting the disarticulation of an attachment from the sensor location on the multifunction mobile computing device, and communicating the distress signals to resources tasked to respond to the distress signals.

In some embodiments, the method further includes receiving condition description indications from a user of the multifunction mobile computing device to for transmission with the distress signal.

In some embodiments, the method further includes communicating response condition description indications to a user of the multifunction mobile computing device in response to the distress signal, and receiving condition description indications from a user of the multifunction mobile computing device to for transmission with the distress signal.

In some embodiments, the method further includes communicating response instructions to a user of the multifunction mobile computing device in response to the distress signal.

In some embodiments, the method further includes communicating to the resources tasked to respond to the distress signals sensor information gathered from the multifunction mobile computing device in response to the distress signal. In some embodiments, the method further includes assessing patterns in multiple distress signals and selecting appropriate responses to one or more distress signals.

In some embodiments, the method further includes communicating to the resources tasked to respond to the distress signals automated instructions selected based on sensor information gathered from the multifunction mobile computing device in response to the distress signal.

Some embodiments include a non-transitory computer-readable storage medium including program instructions. In some embodiments, the program instructions are executable by one or more processors of a network-connected computing device to implement a network monitoring module monitoring signals received over a data network for a presence of one or more distress signals transmitted over a radio-frequency network from a radio-frequency transmitter located within a housing of a multifunction mobile computing device responsive to detecting a disarticulation of an attachment from a sensor location on a multifunction mobile computing device. In some embodiments, the program instructions are executable by one or more processors of a network-connected computing device to implement an assessment module assessing priority of the one or more distress signals transmitted over the radio-frequency network from the radio-frequency transmitter located within the housing of a multifunction mobile computing device responsive to detecting the disarticulation of an attachment from the sensor location on the multifunction mobile computing device. In some embodiments, the program instructions are executable by one or more processors of a network-connected computing device to implement a resource response module communicating the distress signals to resources tasked to respond to the distress signals.

In some embodiments, the program instructions are executable by one or more processors of a network-connected computing device to implement a logging module receiving condition description indications from a user of the multifunction mobile computing device to for transmission with the distress signal.

In some embodiments, the program instructions are executable by one or more processors of a network-connected computing device to implement a real-time communication module communicating response condition description indications to a user of the multifunction mobile computing device in response to the distress signal, and receiving condition description indications from a user of the multifunction mobile computing device to for transmission with the distress signal.

In some embodiments, the program instructions are executable by one or more processors of a network-connected computing device to implement a response instruction communication module communicating response instructions to a user of the multifunction mobile computing device in response to the distress signal.

In some embodiments, the program instructions are executable by one or more processors of a network-connected computing device to implement a responder update diffusion module communicating to the resources tasked to respond to the distress signals sensor information gathered from the multifunction mobile computing device in response to the distress signal.

In some embodiments, the program instructions are executable by one or more processors of a network-connected computing device to implement an analytics module assessing patterns in multiple distress signals and selecting appropriate responses to one or more distress signals.

In some embodiments, the program instructions are executable by one or more processors of a network-connected computing device to implement a responder instruction module communicating to the resources tasked to respond to the distress signals automated instructions selected based on sensor information gathered from the multifunction mobile computing device in response to the distress signal.

Some embodiments include a system for facilitating automated response to a distress signal. In some embodiments, the system includes a housing, a sensor location coupled to the housing, a processor located within the housing, a non-transitory computer-readable storage medium, a radio-frequency transmitter located within the housing, and an attachment for the multifunction mobile computing device. In some embodiments, the attachment removably articulates to the sensor location coupled to the housing of the multifunction mobile computing device. Some embodiments include a computer program product in the non-transitory computer-readable medium of the multifunction mobile computing device, wherein the program instructions are computer-executable to implement detecting a disarticulation of the attachment from the sensor location on the multifunction mobile computing device, and responsive to the detecting the disarticulation of the attachment from the sensor location on the multifunction mobile computing device, transmitting to a distress signal response receiver over a radio-frequency network from the radio-frequency transmitter located within the housing of the multifunction mobile computing device the distress signal.

In some embodiments, the program instructions are further computer-executable to implement, responsive to the detecting the disarticulation of the attachment from the sensor location on the multifunction mobile computing device, presenting a distress signal control interface capable of receiving an order from a user of the multifunction mobile computing device to prevent transmission of the distress signal, and, responsive to the order from a user of the multifunction mobile computing device to prevent transmission of the distress signal, preventing transmission of the distress signal.

In some embodiments, the program instructions are further computer-executable to implement, responsive to the detecting the disarticulation of the attachment from the sensor location on the multifunction mobile computing device, over-riding a locked screen condition of the multifunction mobile computing device and presenting a distress signal control interface capable of receiving an order from a user of the multifunction mobile computing device to control parameters of transmission of the distress signal.

In some embodiments, the program instructions are further computer-executable to implement, responsive to the detecting the disarticulation of the attachment from the sensor location on the multifunction mobile computing device, over-riding a locked screen condition of the multifunction mobile computing device, and presenting a distress signal data input interface capable of receiving condition description indications from a user of the multifunction mobile computing device for transmission with the distress signal.

In some embodiments, the program instructions are further computer-executable to implement, responsive to the detecting the disarticulation of the attachment from the sensor location on the multifunction mobile computing device, and presenting a distress signal control interface capable of receiving an order from a user of the multifunction mobile computing device to prevent transmission of the distress signal. In some embodiments, the presenting the distress signal control interface capable of receiving the order from a user of the multifunction mobile computing device to prevent transmission of the distress signal further includes presenting a distress signal control interface capable of receiving a duress indication order from the user of the multifunction mobile computing device. In some embodiments, the program instructions are further computer-executable to implement, responsive to receiving the duress indication order from the user of the multifunction mobile computing device, indicating over a user interface of the multifunction mobile computing device prevention of transmission of the distress signal, and transmitting the distress signal with a duress indicator.

In some embodiments, the program instructions are further computer-executable to implement, responsive to the detecting the disarticulation of the attachment from the sensor location on the multifunction mobile computing device, capturing input data received from one or more sensors of the multifunction mobile computing device, and transmitting to the distress signal response receiver over the radio-frequency network from the radio-frequency transmitter located within the housing of the multifunction mobile computing device the input data received from the one or more sensors of the multifunction mobile computing device.

In some embodiments, the program instructions are further computer-executable to implement, responsive to the detecting the disarticulation of the attachment from the sensor location on the multifunction mobile computing device, capturing location data describing a location of the multifunction mobile computing device, and transmitting to the distress signal response receiver over the radio-frequency network from the radio-frequency transmitter located within the housing of the multifunction mobile computing device the location data describing the location of the multifunction mobile computing device.

In some embodiments, the program instructions are further computer-executable to implement responsive to the detecting the disarticulation of the attachment from the sensor location on the multifunction mobile computing device, capturing input data received from one or more external sensors affiliated with the multifunction mobile computing device, and transmitting to the distress signal response receiver over the radio-frequency network from the radio-frequency transmitter located within the housing of the multifunction mobile computing device the input data received from the one or more external sensors affiliated with the multifunction mobile computing device.

In some embodiments, the program instructions are further computer-executable to implement, responsive to the detecting the disarticulation of the attachment from the sensor location on the multifunction mobile computing device, capturing audio input data received from one or more audio sensors of the multifunction mobile computing device, and transmitting to the distress signal response receiver over the radio-frequency network from the radio-frequency transmitter located within the housing of the multifunction mobile computing device the audio input data received from the one or more audio sensors of the multifunction mobile computing device.

In some embodiments, the program instructions are further computer-executable to implement, responsive to the detecting the disarticulation of the attachment from the sensor location on the multifunction mobile computing device, capturing video input data received from one or more video sensors of the multifunction mobile computing device, and transmitting to the distress signal response receiver over the radio-frequency network from the radio-frequency transmitter located within the housing of the multifunction mobile computing device the video input data received from the one or more video sensors of the multifunction mobile computing device.

In some embodiments, the program instructions are further computer-executable to implement, responsive to the detecting the disarticulation of the attachment from the sensor location on the multifunction mobile computing device, capturing motion input data received from one or more motion sensors of the multifunction mobile computing device, and transmitting to the distress signal response receiver over the radio-frequency network from the radio-frequency transmitter located within the housing of the multifunction mobile computing device the motion input data received from the one or more motion sensors of the multifunction mobile computing device.

In some embodiments, the program instructions are further computer-executable to implement, responsive to the detecting the disarticulation of the attachment from the sensor location on the multifunction mobile computing device, capturing vital sign input data received from one or more vital sign sensors reporting to the multifunction mobile computing device, and transmitting to the distress signal response receiver over the radio-frequency network from the radio-frequency transmitter located within the housing of the multifunction mobile computing device the vital sign input data received from the one or more vital sign sensors reporting to the multifunction mobile computing device.

In some embodiments, the sensor location includes an audio output connector coupled to a housing of the multifunction mobile computing device, and the attachment includes an articulating component dimensioned for removable articulation to the audio output connector.

In some embodiments, the sensor location includes an audio output connector coupled to a housing of the multifunction mobile computing device, and the attachment includes an electrically-conductive articulating component dimensioned for removable articulation to the audio output connector.

In some embodiments, the sensor location includes a digital data connector coupled to a housing of the multifunction mobile computing device, and the attachment includes an articulating component dimensioned for removable articulation to the digital data connector.

In some embodiments, the sensor location includes a magnetic peripheral articulation connector coupled to a housing of the multifunction mobile computing device, and the attachment includes an articulating component polarized for magnetic removable articulation to the magnetic peripheral articulation connector.

In some embodiments, the sensor location includes an electric power transmission connector coupled to a housing of the multifunction mobile computing device, the attachment includes an articulating component dimensioned for removable articulation to the electric power transmission connector.

In some embodiments, the program instructions are further computer-executable to implement transmitting to a distress signal response receiver over a radio-frequency network from a radio-frequency transmitter located within a housing of the multifunction mobile computing device the distress signal further include program instructions computer-executable to implement transmitting to a distress signal response receiver over a radio-frequency network from a radio-frequency transmitter located within a housing of the multifunction mobile computing device the distress signal without presenting any visible or audible indication of the transmission of the distress signal.

In some embodiments, the program instructions are further computer-executable to implement, responsive to the detecting the disarticulation of the attachment from the sensor location on the multifunction mobile computing device, providing an audible indication of the transmission of the distress signal.

In some embodiments, the program instructions are further computer-executable to implement, responsive to the detecting the disarticulation of the attachment from the sensor location on the multifunction mobile computing device, providing a vibration as an indication of the transmission of the distress signal.

In some embodiments, the program instructions are further computer-executable to implement, responsive to the detecting the disarticulation of the attachment from the sensor location on the multifunction mobile computing device, providing light from a visible light source as an indication of the transmission of the distress signal.

Example Embodiments

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

FIG. 1 depicts an ecosystem for facilitating automated response to a distress signal, in accordance with some embodiments. A distress signal response receiver 106 receives at a client interface 118 distress signals over communication links 110a-110b, such as communication over a network 108, from distress signal modules 112a-112b executing on multifunction mobile computing devices 114a-114b, such as mobile phones, tablet computers, personal digital assistants, or laptop computers. In some embodiments, an incident response management module 120 executing on distress signal response receiver 106 transmits through client interface 118 the distress signals (or communications embodying the distress signals) to responder clients 102a-102b over communication links 104a-104b, such as communication over a network 108, for presentation through responder interfaces 122a-122b. In some embodiments, responder clients 102a-102b are multifunction mobile computing devices 114a-114b, such as mobile phones, tablet computers, personal digital assistants, special-purpose emergency responder radio devices, or laptop computers capable of inter-responder communications 130. In some embodiments, distress signal modules 112a-112b executing on multifunction mobile computing devices 114a-114b, such as mobile phones, tablet computers, personal digital assistants, or laptop computer communicate distress signals over communication channels 110c directly to responder clients 102a-102b. In some embodiments, distress signal response receiver 106 maintains a database of distress signals received from distress signal modules 112a-112b executing on multifunction mobile computing devices 114a-114b.

In one example use case, a multifunction mobile computing device 114b includes a mobile telephone (e.g., see FIG. 2) equipped with a peripheral device (e.g., a tether coupled to a plug-style attachment that is inserted into the audio jack of the multifunction mobile computing device 114b) for use in causing the multifunction mobile computing device 114b to facilitate automated response to a distress signal by transmitting a distress signal from the multifunction mobile computing device 114b.

In some embodiments, the peripheral device includes the tether and the plug-style attachment configured for removably articulating the attachment to the multifunction mobile computing device 114b. In the example embodiment, the plug-style attachment removably articulates to a sensor location coupled to the housing of the multifunction mobile computing device 114b, such as the audio jack, or a data port, or a power connector port. In some embodiments, the attachment removably articulates to a sensor location in a manner detectable to a sensor housed at the sensor location.

Upon becoming alarmed at circumstances in a user's local area, the user of the multifunction mobile computing device 114b pulls the tether to cause separation of the multifunction mobile computing device 114b from the peripheral (e.g., the plug attachment is removed from the audio jack of the multifunction mobile computing device 114b). In some embodiments, upon application of force to the tether in a direction away from the sensor location, the sensor housed at the sensor location detects removal of the attachment and causes the multifunction mobile computing device 114b to transmit a distress signal to distress signal response receiver 106 over communication channel 110b or directly to responder client 102a over communication channel 110c. Thus, in some embodiments, the act of connecting or disconnecting the attachment itself triggers certain functions of the multifunction mobile computing device 114b, such as transmission of a distress signal. In some embodiments, the act of connecting or disconnecting the attachment itself triggers certain functions of the multifunction mobile computing device 114b, such as transmission of a distress signal, even if a screen multifunction mobile computing device 114b (e.g., of the phone) is in a locked condition and incapable of receiving standard touchscreen input.

As an example of use of one embodiment, a jogger who gets attacked in the park while jogging pulls a strap attached to a plug-style attachment that is inserted into the audio jack of the multifunction mobile computing device 114b (her phone). In some embodiments, the act of pulling the strap and thereby removing the plug-style attachment from the audio jack causes transmission of a distress signal to distress signal response receiver 106 over communication channels 110b for routing of the distress signal by distress signal response receiver 106 for routing over communication channel 104b to a responder client 102b in the squad-car of a local policeman.

As example of use of another embodiment, a jogger who gets attacked in the park while jogging pulls a strap attached to a plug-style attachment that is inserted into the audio jack of the multifunction mobile computing device 114b (his smartwatch). In some embodiments, the act of pulling the strap and thereby removing the plug-style attachment from the audio jack causes transmission of a distress signal directly to a user-pre-selected responder client 102b (e.g., a fellow jogger on the trail, for example by sending email, text messages, or an audio message) over communication channels 110c.

As example of use of another embodiment, a jogger who gets attacked in the park while jogging pulls a strap attached to a plug-style attachment that is inserted into the audio jack of the multifunction mobile computing device 114b (his smartwatch). In some embodiments, the act of pulling the strap and removing the plug-style attachment from the audio jack causes transmission of a distress signal directly to a user-pre-selected responder client 102b (e.g., a fellow jogger on the trail, for example by sending email, text messages, or an audio message) over communication channels 110c and transmission of a distress signal to distress signal response receiver 106 over communication channels 110b for routing of the distress signal by distress signal response receiver 106 for routing over communication channel 104b to a responder client 102b in the squad-car of a local policeman. In some embodiments, the distress signal transmitted to responder clients 102a-102b can include details such as a map pointing to the location of multifunction mobile computing device 114b and any sensor data (e.g., audio or video, position, vital signs picked up from a personal fitness sensor coupled to the multifunction mobile computing device 114b by a radio-frequency link) received from multifunction mobile computing device 114b.

As example of use of another embodiment, a Marine who gets attacked in a combat zone pulls a strap attached to a plug-style attachment that is inserted into the power input jack of the multifunction mobile computing device 114b (his combat radio). In some embodiments, the act of pulling the strap and removing the plug-style attachment from the audio jack causes transmission of a distress signal directly to a user-pre-selected responder client 102b (e.g., one or more Marines in his platoon, for example by sending email, text messages, or an audio message) over communication channels 110c and transmission of a distress signal to distress signal response receiver 106 (e.g., a combat intelligence management server) over communication channels 110b for routing of the distress signal by distress signal response receiver 106 for routing over communication channel 104b to a responder client 102b in a nearby tank. In some embodiments, the distress signal transmitted to responder clients 102a-102b can include details such as a map pointing to the location of multifunction mobile computing device 114b and any sensor data (e.g., audio or video, position, vital signs picked up from a personal health sensor coupled to the multifunction mobile computing device 114b by a radio-frequency link) received from multifunction mobile computing device 114b.

In some embodiments a system for facilitating automated response to a distress signal includes a network monitoring module, such as a component of incident response management module 120, monitoring or configured for monitoring signals received over a data network, such as network 108, for a presence of one or more distress signals transmitted over a radio-frequency network (e.g., communication links 110a-110b) from a radio-frequency transmitter located within a housing of a multifunction mobile computing device (e.g., multifunction mobile computing devices 114a-114b). While the example embodiment portrayed in FIG. 1 illustrates as a network monitoring module incident response management module 120, one of skill in the art will readily comprehend in light of having read the present disclosure that a network monitoring module may also be implemented as functions executing on a responder interface 122a of a responder client receiving distress signals over communication channels 110c without departing from the scope and intent of the present disclosure.

Responsive to detecting a disarticulation of an attachment from a sensor location on a multifunction mobile computing device 114b, an assessment module within incident response management module 120 assesses or is configured for assessing priority of the one or more distress signals transmitted over the radio-frequency network (e.g., communication links 110a-110b) from the radio-frequency transmitter located within the housing of a multifunction mobile computing device responsive to detecting the disarticulation of an attachment from the sensor location on the multifunction mobile computing device 114*b*. A resource response module within incident response management module 120 communicates or is configured for communicating the distress signals to resources (e.g., responder clients 102*a*-102*b*) tasked to respond to the distress signals.

In some embodiments, the system includes a logging module within incident response management module 120 receiving or configured for receiving condition description indications from a user of the multifunction mobile computing device 114*b* for transmission with the distress signal. In some embodiments, the system includes a real-time communication module within incident response management module 120 communicating or configured for communicating response condition description indications to a user of the multifunction mobile computing device 114*b* in response to the distress signal over communication links 110*b*, and receiving condition description indications from a user of the multifunction mobile computing device 114*b* for transmission with the distress signal over communication links 110*b*.

In some embodiments, the system includes a response instruction communication module within incident response management module 120 communicating or configured for communicating response instructions over communication links 110*b* to a user of the multifunction mobile computing device 114*b* in response to the distress signal. In some embodiments, the system includes a responder update diffusion module within incident response management module 120 communicating or configured for communicating over communication links 104*a*-104*b* to the resources tasked to respond to the distress signals (e.g., responder clients 102*a*-102*b*) sensor information gathered from the multifunction mobile computing device 114*b* in response to the distress signal.

In some embodiments, the system includes an analytics module within incident response management module 120 assessing or configured for assessing patterns in multiple distress signals within database 116 and selecting appropriate responses to one or more distress signals. In some embodiments, the system includes a responder instruction module within incident response management module 120 communicating or configured for communicating over communication links 110*b* to the resources tasked to respond to the distress signals (e.g., responder clients 102*a*-102*b*) automated instructions selected based on sensor information gathered from the multifunction mobile computing device 114*b* in response to the distress signal.

Figure 2A:
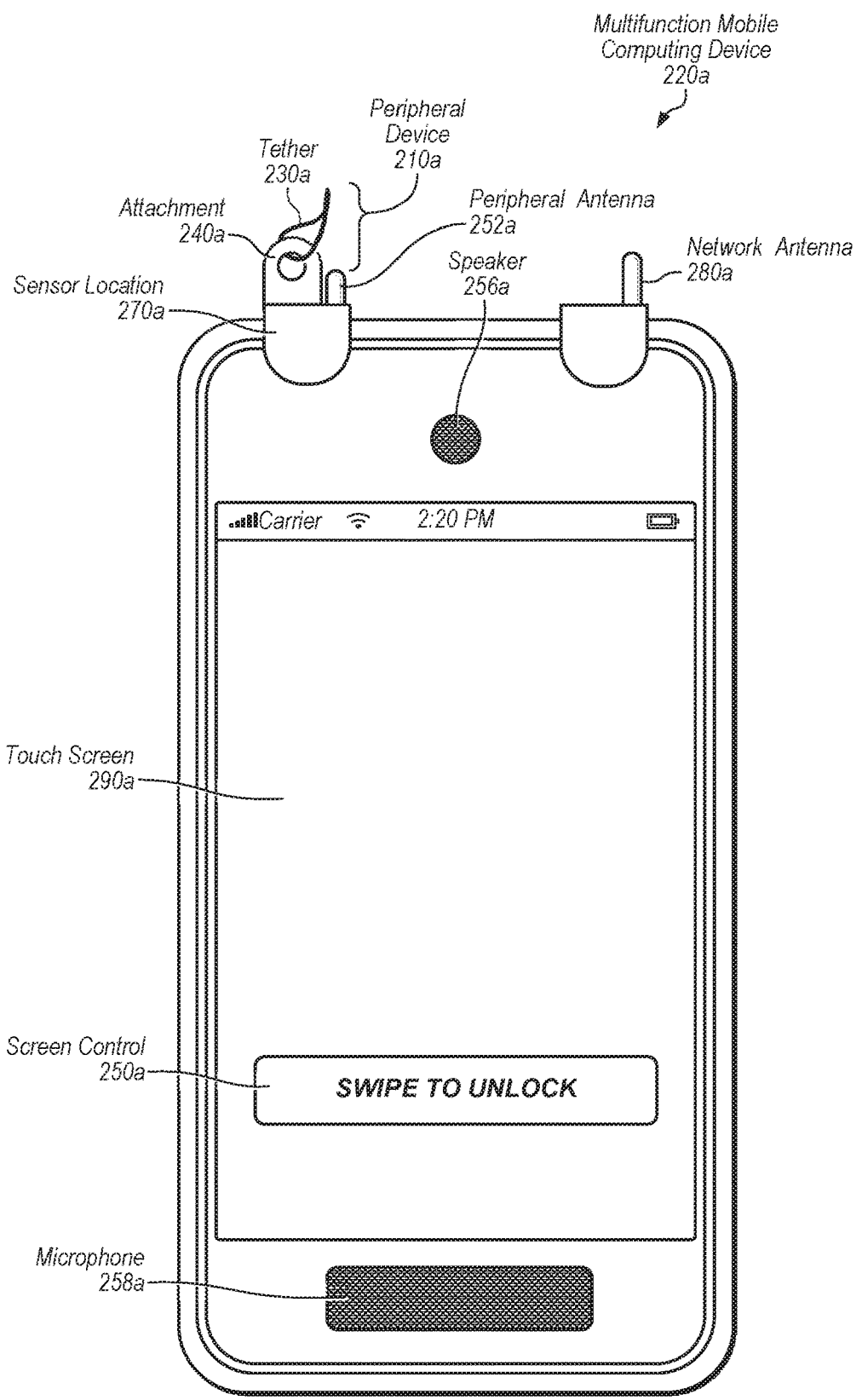
FIG. 2A illustrates a multifunction mobile computing device equipped with an attachment for facilitating automated response to a distress signal, in accordance with some embodiments.

FIG. 2A illustrates a multifunction mobile computing device equipped with an attachment for facilitating automated response to a distress signal, in accordance with some embodiments. A multifunction mobile computing device 220*a* is coupled to a peripheral device 210*a* including a tether 230*a* and an attachment 240*a* connected to a sensor location 270*a*. The multifunction mobile computing device 220*a* includes a peripheral antenna 252*a*, which, in some embodiments, may be used for communication with either remote sensors or wearable computing or sensor devices (smartwatches, computing goggles) or, in some embodiments, with peripheral device 210*a*. The multifunction mobile computing device 220*a* further includes a network antenna 280*a* for communicating with a data network, such as network 108 of FIG. 1. The multifunction mobile computing device 220*a* further includes a speaker 256*a*, a touch screen 290*a* showing a screen control 250*a* and a microphone 258*a*. Functions of various components of multifunction mobile computing device 220*a* are discussed below with respect to FIGS. 19-20.

In some embodiments, peripheral device 210*a* is used in and configured for use in causing multifunction mobile computing device 220*a* to facilitate automated response to distress signals. As shown, peripheral device 210*a* includes an attachment 240*a* for a multifunction mobile computing device 220*a*. In some embodiments, the attachment 240*a* removably articulates to a sensor location 270*a* coupled to the housing of the multifunction mobile computing device 220*a*. In some embodiments, the attachment 240*a* removably articulates to a sensor location 270*a* in a manner detectable to a sensor housed at the sensor location 270*a*. In some embodiments, the peripheral device 210*a* includes a tether 230*a* for removably articulating the attachment 240*a* to a user of the multifunction mobile computing device 220*a*. In some embodiments, upon application of force to the tether 230*a* in a direction away from the sensor location 270*a*, the sensor housed at the sensor location 270*a* detects removal of the attachment 240*a* and causes the multifunction mobile computing device to transmit a distress signal over network antenna 280*a* or to a nearby cooperating multifunction mobile computing device over peripheral antenna 252*a*.

In some embodiments, the sensor location 270*a* includes an audio output connector (not visible) coupled to a housing of the multifunction mobile computing device 220*a*, and the attachment 240*a* includes an articulating component (not visible) dimensioned for removable articulation to the audio output connector (not visible).

In some embodiments, the sensor location 270*a* includes an audio output connector (not visible) coupled to a housing of the multifunction mobile computing device 220*a*, and the attachment 240*a* includes an electrically-conductive articulating component (not visible) dimensioned for removable articulation to the audio output connector (not visible).

In some embodiments, the sensor location 270*a* includes a digital data connector (not visible) coupled to a housing of the multifunction mobile computing device 220*a*, and the attachment 240*a* includes an articulating component (not visible) dimensioned for removable articulation to the digital data connector (not visible).

In some embodiments, the sensor location 270*a* includes a magnetic peripheral articulation connector (not visible) coupled to a housing of the multifunction mobile computing device 220*a*, and the attachment 240*a* includes an articulating component polarized for magnetic removable articulation to the magnetic peripheral articulation connector.

In some embodiments, the sensor location 270*a* includes an electric power transmission connector (not visible) coupled to a housing of the multifunction mobile computing device 220*a*, and the attachment 240*a* includes an articulating component dimensioned for removable articulation to the electric power transmission connector (not visible).

In some embodiments, the sensor location includes 270*a* a radio frequency antennae, such as peripheral antenna 252*a* coupled to a housing of the multifunction mobile computing device 220*a*, the attachment 240*a* includes an electronic device having a data connection to the sensor location via a radio frequency channel between the attachment 240*a* and the multifunction mobile computing device 220*a* over peripheral antenna 252*a* (e.g., via near field communication or Bluetooth), and the disarticulation includes an attenuation of the data connection. Thus, in some embodiments, a physical attachment to the mobile computing device 220*a* is not required for operation as described herein of the peripheral device 210*a*. In some embodiments, the peripheral device 210*a* signals multifunction mobile computing device 220*a* in response to a detachment of attachment from a housing, causing transmission of a distress signal as described herein.

In some embodiments, the sensor location includes 270*a* a radio frequency antennae, such as peripheral antenna 252*a* coupled to a housing of the multifunction mobile computing device 220*a*, the attachment 240*a* includes an electronic device having a data connection to the sensor location via a radio frequency channel between the attachment 240*a* and the multifunction mobile computing device 220*a* over peripheral antenna 252*a* (e.g., via near field communication or Bluetooth), and the disarticulation includes a loss of the data connection. Thus, in some embodiments, a physical attachment to the mobile computing device 220*a* is not required for operation as described herein of the peripheral device 210*a*. In some embodiments, the peripheral device 210*a* signals multifunction mobile computing device 220*a* in response to a detachment of attachment from a housing, causing transmission of a distress signal as described herein.

Figure 2B:
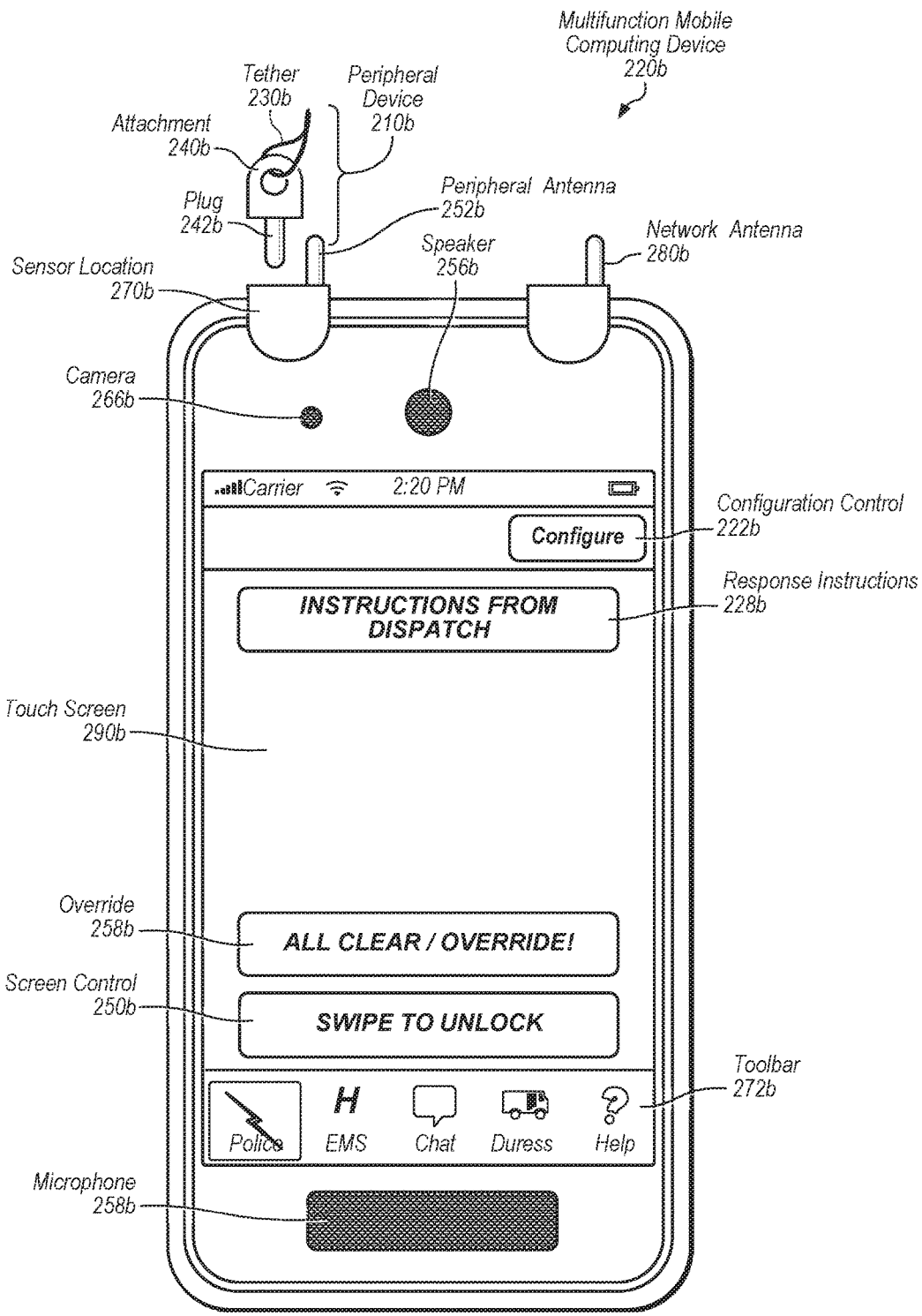
FIG. 2B depicts a multifunction mobile computing device equipped with an attachment for facilitating automated response to a distress signal, in accordance with some embodiments.

FIG. 2B depicts a multifunction mobile computing device equipped with an attachment for facilitating automated response to a distress signal, in accordance with some embodiments. A multifunction mobile computing device 220*b* is decoupled from a peripheral device 210*b* including a tether 230*b* and an attachment 240*b* for connection to a sensor location 270*b*. The multifunction mobile computing device 220*b* includes a peripheral antenna 252*b*, which, in some embodiments, may be used for communication with either remote sensors or wearable computing or sensor devices (smartwatches, computing goggles) or, in some embodiments, with peripheral device 210*b*. The multifunction mobile computing device 220*b* further includes a network antenna 280*b* for communicating with a data network, such as network 108 of FIG. 1. The multifunction mobile computing device 220*b* further includes a speaker 256*b*, a touch screen 290*b* and a microphone 258*b*. Touch screen 290*b* shows an override control 258*b*, a screen unlock control 250*b*, a toolbar 272*b*, a configuration control 222*b*, and response instructions 228*b*. Examples of a response instructions 228*b* to a user can include, in the event of a medical emergency, treatment instructions. In the event of a security emergency, an example of response instructions 228*b* to a user can include directions to a police station. Functions of various components of multifunction mobile computing device 220*b* are discussed below with respect to FIGS. 19-20.

In some embodiments, peripheral device 210*b* is used in and configured for use in causing multifunction mobile computing device 220*b* to facilitate automated response to distress signals. As shown, peripheral device 210*b* includes an attachment 240*b* for a multifunction mobile computing device 220*b*. In some embodiments, the attachment 240*b* removably articulates using plug 242*b* to a sensor location 270*b* coupled to the housing of the multifunction mobile computing device 220*b*. In some embodiments, the attachment 240*b* removably articulates to a sensor location 270*b* in a manner detectable to a sensor housed at the sensor location 270*b*. In some embodiments, the peripheral device 210*b* includes a tether 230*b* for removably articulating the attachment 240*b* to a user of the multifunction mobile computing device 220*b*. In some embodiments, upon application of force to the tether 230*b* in a direction away from the sensor location 270*b*, the sensor housed at the sensor location 270*b* detects removal of the attachment 240*b* and causes the multifunction mobile computing device to transmit a distress signal over network antenna 280*b* or to a nearby cooperating multifunction mobile computing device over peripheral antenna 252*b*.

In some embodiments, the sensor location 270*b* includes an audio output connector (not visible) coupled to a housing of the multifunction mobile computing device 220*b*, and the attachment 240*b* includes an articulating component (plug 242*b*) dimensioned for removable articulation to the audio output connector (not visible).

In some embodiments, the sensor location 270*b* includes an audio output connector (not visible) coupled to a housing of the multifunction mobile computing device 220*b*, and the attachment 240*b* includes an electrically-conductive articulating component (plug 242*b*) dimensioned for removable articulation to the audio output connector (not visible).

In some embodiments, the sensor location 270*b* includes a digital data connector (not visible) coupled to a housing of the multifunction mobile computing device 220*b*, and the attachment 240*b* includes an articulating component (plug 242*b*) dimensioned for removable articulation to the digital data connector (not visible).

In some embodiments, the sensor location 270*b* includes a magnetic peripheral articulation connector (not visible) coupled to a housing of the multifunction mobile computing device 220*b*, and the attachment 240*b* includes an articulating component polarized for magnetic removable articulation to the magnetic peripheral articulation connector.

In some embodiments, the sensor location 270*b* includes an electric power transmission connector (not visible) coupled to a housing of the multifunction mobile computing device 220*b*, and the attachment 240*b* includes an articulating component (plug 242*b*) dimensioned for removable articulation to the electric power transmission connector (not visible).

In some embodiments, the sensor location includes 270*b* a radio frequency antennae, such as peripheral antenna 252*b* coupled to a housing of the multifunction mobile computing device 220*b*, the attachment 240*b* includes an electronic device having a data connection to the sensor location via a radio frequency channel between the attachment 240*b* and the multifunction mobile computing device 220*b* over peripheral antenna 252*b* (e.g., via near field communication or Bluetooth), and the disarticulation includes an attenuation of the data connection. Thus, in some embodiments, a physical attachment to the mobile computing device 220*b* is not required for operation as described herein of the peripheral device 210*b*. In some embodiments, the peripheral device 210*b* signals multifunction mobile computing device 220*b* in response to a detachment of attachment from a housing, causing transmission of a distress signal as described herein.

In some embodiments, the sensor location includes 270*b* a radio frequency antennae, such as peripheral antenna 252*b* coupled to a housing of the multifunction mobile computing device 220*b*, the attachment 240*b* includes an electronic device having a data connection to the sensor location via a radio frequency channel between the attachment 240*a* and the multifunction mobile computing device 220*b* over peripheral antenna 252*b* (e.g., via near field communication or Bluetooth), and the disarticulation includes a loss of the data connection. Thus, in some embodiments, a physical attachment to the mobile computing device 220*b* is not required for operation as described herein of the peripheral device 210*b*. In some embodiments, the peripheral device 210*b* signals multifunction mobile computing device 220*b* in response to a detachment of attachment from a housing, causing transmission of a distress signal as described herein.

Various embodiments of a system and method for facilitating automated response to a distress signal are disclosed. In some embodiments, a system for facilitating automated response to a distress signal includes an attachment 240b for a multifunction mobile computing device 220b. In some embodiments, the attachment removably articulates to a sensor location 270b coupled to a housing of the multifunction mobile computing device 220b. In some embodiments, the system includes a computer program product in a non-transitory computer-readable medium, such as is described below with respect to FIGS. 18-20. In some embodiments, the program instructions are computer-executable by the multifunction mobile computing device to implement detecting a disarticulation of the attachment 240b from the sensor location 270b on the multifunction mobile computing device 220b, and, responsive to the detecting the disarticulation of the attachment 240b from the sensor location 270b on the multifunction mobile computing device 220b, transmitting to a distress signal response receiver (such as may, for example, be implemented in hardware described below with respect to FIGS. 18-20) over a radio-frequency network from a radio-frequency transmitter (e.g., using peripheral antenna 252b or network antenna 280b) located within a housing of the multifunction mobile computing device 220b the distress signal.

Some embodiments present a toggle control (override 258b) to allow a user to prevent the transmission of a distress signal after detachment of the attachment or to cause transmission (e.g., using peripheral antenna 252b or network antenna 280b) of an 'all clear' to cancel a distress signal. In some embodiments, the program instructions are further computer-executable to implement, responsive to the detecting the disarticulation of the attachment 240b from the sensor location 270b on the multifunction mobile computing device 220b, presenting a distress signal control interface (e.g., override 258b) capable of receiving an order from a user of the multifunction mobile computing device 220b to prevent transmission of the distress signal, and, responsive to the order (e.g., actuation of override 258b) from a user of the multifunction mobile computing device 220b to prevent transmission of the distress signal, preventing transmission of the distress signal or broadcasting an all-clear signal (e.g., using peripheral antenna 252b or network antenna 280b).

Some embodiments include the ability to transmit (e.g., using peripheral antenna 252b or network antenna 280b) or block transmission of a distress signal on a multifunction mobile computing device in spite of the 'locked screen' condition of on the multifunction mobile computing device 220b. In some embodiments, the program instructions are further computer-executable to implement, responsive to the detecting the disarticulation of the attachment 240b from the sensor location 270b on the multifunction mobile computing device 220b, over-riding a locked screen condition of the multifunction mobile computing device (e.g., by presenting override 258), and presenting a distress signal control interface capable of receiving an order from a user of the multifunction mobile computing device to control parameters of transmission of the distress signal (e.g., toolbar 272b).

Some embodiments present a data-entry interface (e.g., toolbar 272b). In some embodiments, the program instructions are further computer-executable to implement, responsive to the detecting the disarticulation of the attachment 240b from the sensor location 270b on the multifunction mobile computing device 220b, over-riding a locked screen condition of the multifunction mobile computing device 220b, and presenting a distress signal data input interface (toolbar 272b) capable of receiving condition description indications from a user of the multifunction mobile computing device for transmission with the distress signal (toolbar 272b).

In some embodiments, transmission of a distress signal is accomplished without any action of the user subsequent to removal of attachment 240a from sensor location 270a. In a moment of panic or struggle, a user may simply yank tether 230a to remove peripheral device 210a from sensor location 270a, and a distress signal will be transmitted by multifunction mobile computing device 220a without further user intervention. In such embodiments, a "zero button solution" enables the user to send a signal that will summon help without interacting with a screen 290a of multifunction mobile computing device 220a, without regard to whether screen 290a is locked or unlocked, or even after screen 290a is rendered inoperable due to impact that shatters screen 290a.

Some embodiments support user entry of duress codes (e.g., through toolbar 272b). In some embodiments, the program instructions are further computer-executable to implement, responsive to the detecting the disarticulation of the attachment 240b from the sensor location 270b on the multifunction mobile computing device 220b, presenting a distress signal control interface (override 258b) capable of receiving an order from a user of the multifunction mobile computing device 220b to prevent transmission of the distress signal. In some embodiments, the presenting the distress signal control interface (override 258b) capable of receiving the order from a user of the multifunction mobile computing device 220b to prevent transmission of the distress signal further includes presenting a distress signal control interface capable of receiving a duress indication order (e.g., through toolbar 272b) from the user of the multifunction mobile computing device 220b. In some embodiments, the program instructions are further computer-executable to implement, responsive to receiving the duress indication order (e.g., through toolbar 272b) from the user of the multifunction mobile computing device 220b, indicating over a user interface (e.g., through override 258b) of the multifunction mobile computing device 220b prevention of transmission of the distress signal, and transmitting the distress signal with a duress indicator (e.g., using peripheral antenna 252b or network antenna 280b).

Some embodiments capture sensor data (e.g. location, sound from microphone 258b, a visual data from camera 266b, or data from an external sensor device connected through peripheral antenna 252b) for transmission in conjunction with the transmission of distress signals. Non-limiting examples of such data include location data, audio, video, movement information, vital sign information, and information from third-party sensor devices affiliated with a multifunction mobile computing device. In some embodiments, the program instructions are further computer-executable to implement, responsive to the detecting the disarticulation of the attachment 240b from the sensor location 270b on the multifunction mobile computing device 220b, capturing input data received from one or more sensors (e.g. location, sound from microphone 258b, a visual data from camera 266b, or data from an external sensor device connected through peripheral antenna 252b) of the multifunction mobile computing device 220b, and transmitting to the distress signal response receiver over the radio-frequency network from the radio-frequency transmitter (e.g., over network antenna 280b or peripheral antenna 252b) located within the housing of the multifunction mobile computing device 220b the input data received from the one or more sensors (e.g. location, sound from microphone 258b, a visual data from camera 266b, or data from an external sensor device connected through peripheral antenna 252b) of the multifunction mobile computing device 220b.

In some embodiments, the program instructions are further computer-executable to implement, responsive to the detecting the disarticulation of the attachment 240b from the sensor location 270b on the multifunction mobile computing device 220b, capturing location data describing a location of the multifunction mobile computing device, and transmitting to the distress signal response receiver over the radio-frequency network from the radio-frequency transmitter (e.g., over network antenna 280b or peripheral antenna 252b) located within the housing of the multifunction mobile computing device 220b the location data describing the location of the multifunction mobile computing device 220b.

In some embodiments, the program instructions are further computer-executable to implement, responsive to the detecting the disarticulation of the attachment 240b from the sensor location 270b on the multifunction mobile computing device 220b, capturing input data received from one or more external sensors (e.g. data from an external sensor device connected through peripheral antenna 252b) affiliated with the multifunction mobile computing device 220b, and transmitting to the distress signal response receiver over the radio-frequency network (e.g., network 108 of FIG. 1) from the radio-frequency transmitter located within the housing of the multifunction mobile computing device the input data received from the one or more external sensors affiliated with the multifunction mobile computing device 220b.

In some embodiments, the program instructions are further computer-executable to implement, responsive to the detecting the disarticulation of the attachment 240b from the sensor location 270b on the multifunction mobile computing device 270b, capturing audio input data received from one or more audio sensors at microphone 258b of the multifunction mobile computing device 220b, and transmitting to the distress signal response receiver over the radio-frequency network from the radio-frequency transmitter (e.g., over network antenna 280b or peripheral antenna 252b) located within the housing of the multifunction mobile computing device the audio input data received from the one or more audio sensors at microphone 258b of the multifunction mobile computing device 220b.

In some embodiments, the program instructions are further computer-executable to implement, responsive to the detecting the disarticulation of the attachment 240b from the sensor location 270b on the multifunction mobile computing device 220b, capturing video input data received from one or more video sensors at camera 266b of the multifunction mobile computing device 220b, and transmitting (e.g., over network antenna 280b or peripheral antenna 252b) to the distress signal response receiver over the radio-frequency network from the radio-frequency transmitter located within the housing of the multifunction mobile computing device 220b the video input data received from the one or more video sensors at camera 266b of the multifunction mobile computing device 220b.

Figure 19:
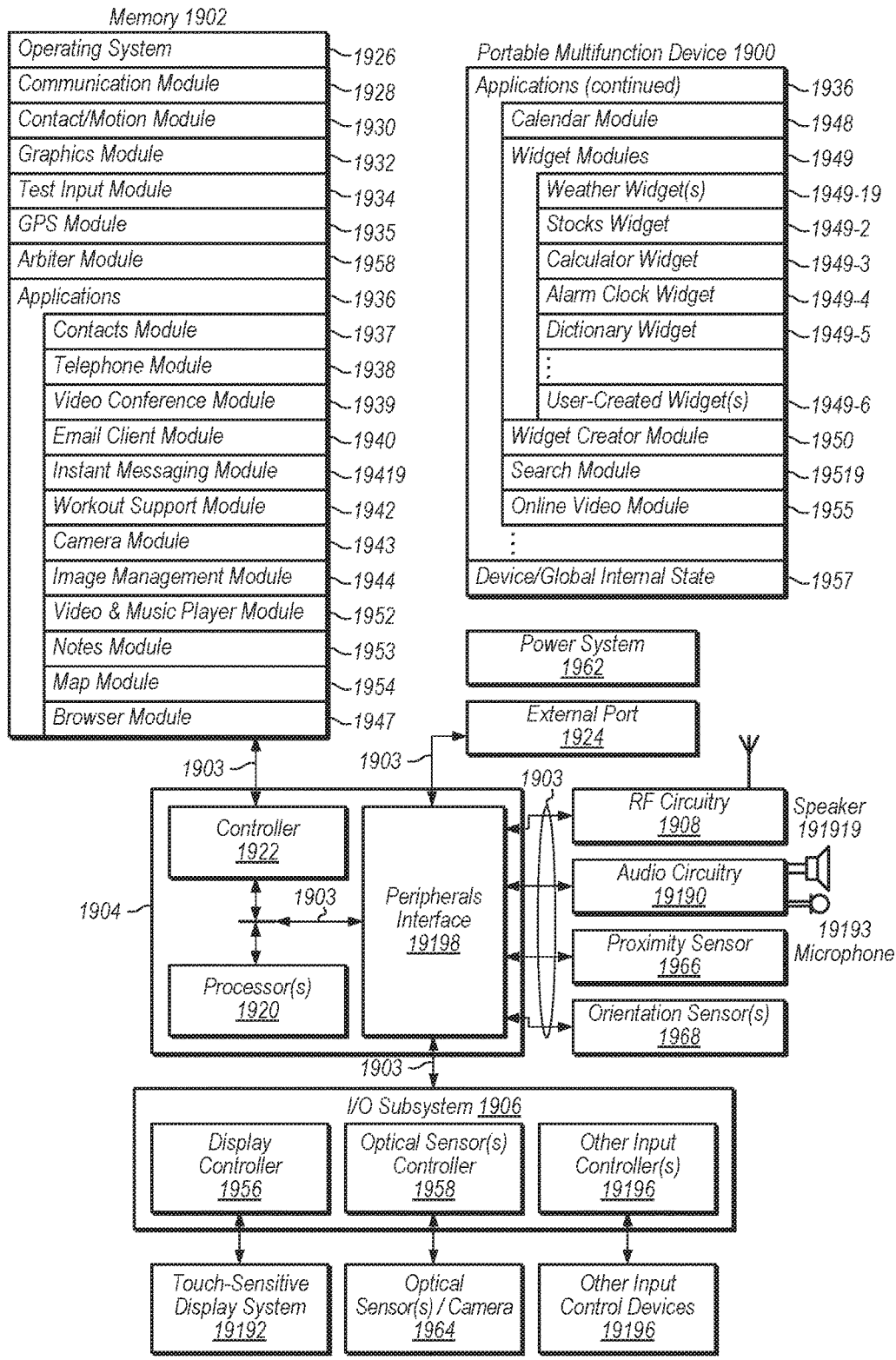
FIG. 19 illustrates a block diagram of a multifunction mobile computing device facilitating automated response to a distress signal, in accordance with some embodiments.

In some embodiments, the program instructions are further computer-executable to implement, responsive to the detecting the disarticulation of the attachment 240b from the sensor location 270b on the multifunction mobile computing device 220b, capturing motion input data received from one or more motion sensors of the multifunction mobile computing device 220b (e.g., using orientation sensors 1968 and contact motion module 1930 of FIG. 19), and transmitting to the distress signal response receiver over the radio-frequency network from the radio-frequency transmitter (e.g., over network antenna 280b or peripheral antenna 252b) located within the housing of the multifunction mobile computing device the motion input data received from the one or more motion sensors (e.g., using orientation sensors 1968 and contact motion module 1930 of FIG. 19) of the multifunction mobile computing device 220b.

In some embodiments, the program instructions are further computer-executable to implement, responsive to the detecting the disarticulation of the attachment 240b from the sensor location 270b on the multifunction mobile computing device 220b, capturing vital sign input data received from one or more vital sign sensors reporting to the multifunction mobile computing device (e.g., either internal sensors or sensors connected over peripheral antenna 252b), and transmitting (e.g., over network antenna 280b or peripheral antenna 252b) to the distress signal response receiver over the radio-frequency network from the radio-frequency transmitter located within the housing of the multifunction mobile computing device the vital sign input data received from the one or more vital sign sensors (e.g., either internal sensors or sensors connected over peripheral antenna 252b) reporting to the multifunction mobile computing device 220b.

Various embodiments allow for the attachment to connect to the sensor location 270b of the multifunction mobile computing device 220b in different ways without departing from the scope of the present disclosure. In some embodiments, the sensor location includes 270b an audio output connector coupled to a housing of the multifunction mobile computing device, and the attachment 242b includes an articulating component dimensioned for removable articulation to the audio output connector (e.g., plug 242b). In some embodiments, the sensor location 270b includes an audio output connector coupled to a housing of the multifunction mobile computing device, and the attachment 242b includes an electrically-conductive articulating component dimensioned for removable articulation to the audio output connector (e.g., plug 242b).

In some embodiments, the sensor location 270b includes a digital data connector coupled to a housing of the multifunction mobile computing device, and the attachment 242b includes an articulating component (e.g., plug 242b) dimensioned for removable articulation to the digital data connector.

In some embodiments, the sensor location 270b includes a magnetic peripheral articulation connector coupled to a housing of the multifunction mobile computing device, and the attachment includes an articulating component polarized for magnetic removable articulation to the magnetic peripheral articulation connector.

In some embodiments, the sensor location 270b includes an electric power transmission connector coupled to a housing of the multifunction mobile computing device 220b, and the attachment includes an articulating component dimensioned for removable articulation to the electric power transmission connector (e.g., plug 242b).

In some embodiments, the sensor location includes a radio frequency antennae (e.g., peripheral antenna 252b) coupled to a housing of the multifunction mobile computing device 220b, the attachment 242b includes an electronic device having a data connection to the sensor location 270b via a radio frequency channel (e.g., over peripheral antenna 252b) between the attachment and the multifunction mobile computing device 220b, and the disarticulation includes an attenuation of the data connection.

In some embodiments, the sensor location includes a radio frequency antennae (e.g., peripheral antenna 252b) coupled to a housing of the multifunction mobile computing device 220b, the attachment 242b includes an electronic device having a data connection to the sensor location 270b via a radio frequency channel (e.g., over peripheral antenna 252b) between the attachment and the multifunction mobile computing device 220b, and the disarticulation includes a loss of the data connection.

In some embodiments, the sensor location includes a radio frequency antennae (e.g., peripheral antenna 252b) coupled to a housing of the multifunction mobile computing device 220b, the attachment 242b includes an electronic device having a data connection to the sensor location 270b via a radio frequency channel (e.g., over peripheral antenna 252b) between the attachment and the multifunction mobile computing device 220b, and the disarticulation includes an increase in a distance between the sensor location and the attachment.

Some embodiments support the transmission of a distress signal in a 'silent alarm' mode that allows for transmission of the distress signal without notification of persons in the vicinity of the multifunction mobile computing device (e.g., through speaker 256b or touch screen 290b). In some embodiments, the program instructions computer-executable to implement transmitting to a distress signal response receiver over a radio-frequency network from a radio-frequency transmitter (e.g., over network antenna 280b or peripheral antenna 252b) located within a housing of the multifunction mobile computing device 220b the distress signal further include program instructions computer-executable to implement transmitting to a distress signal response receiver over a radio-frequency network from a radio-frequency transmitter (e.g., over network antenna 280b or peripheral antenna 252b) located within a housing of the multifunction mobile computing device 220b the distress signal without presenting any visible or audible indication of the transmission of the distress signal (e.g., through speaker 256b or touch screen 290b).

Some embodiments support the transmission of a distress signal in a 'local alert' mode that allows for transmission of the distress signal without notification (e.g., through speaker 256b or touch screen 290b) of persons in the vicinity of the multifunction mobile computing device. In some embodiments, the program instructions are further computer-executable to implement, responsive to the detecting the disarticulation of the attachment from the sensor location on the multifunction mobile computing device, providing an audible indication of the transmission of the distress signal (e.g., through speaker 256b or touch screen 290b).

In some embodiments, the program instructions are further computer-executable to implement, responsive to the detecting the disarticulation of the attachment from the sensor location 270b on the multifunction mobile computing device 220b, providing a vibration as an indication of the transmission of the distress signal.

In some embodiments, the program instructions are further computer-executable to implement, responsive to the detecting the disarticulation of the attachment from the sensor location on the multifunction mobile computing device, providing light from a visible light source as an indication of the transmission of the distress signal.

Figure 3:
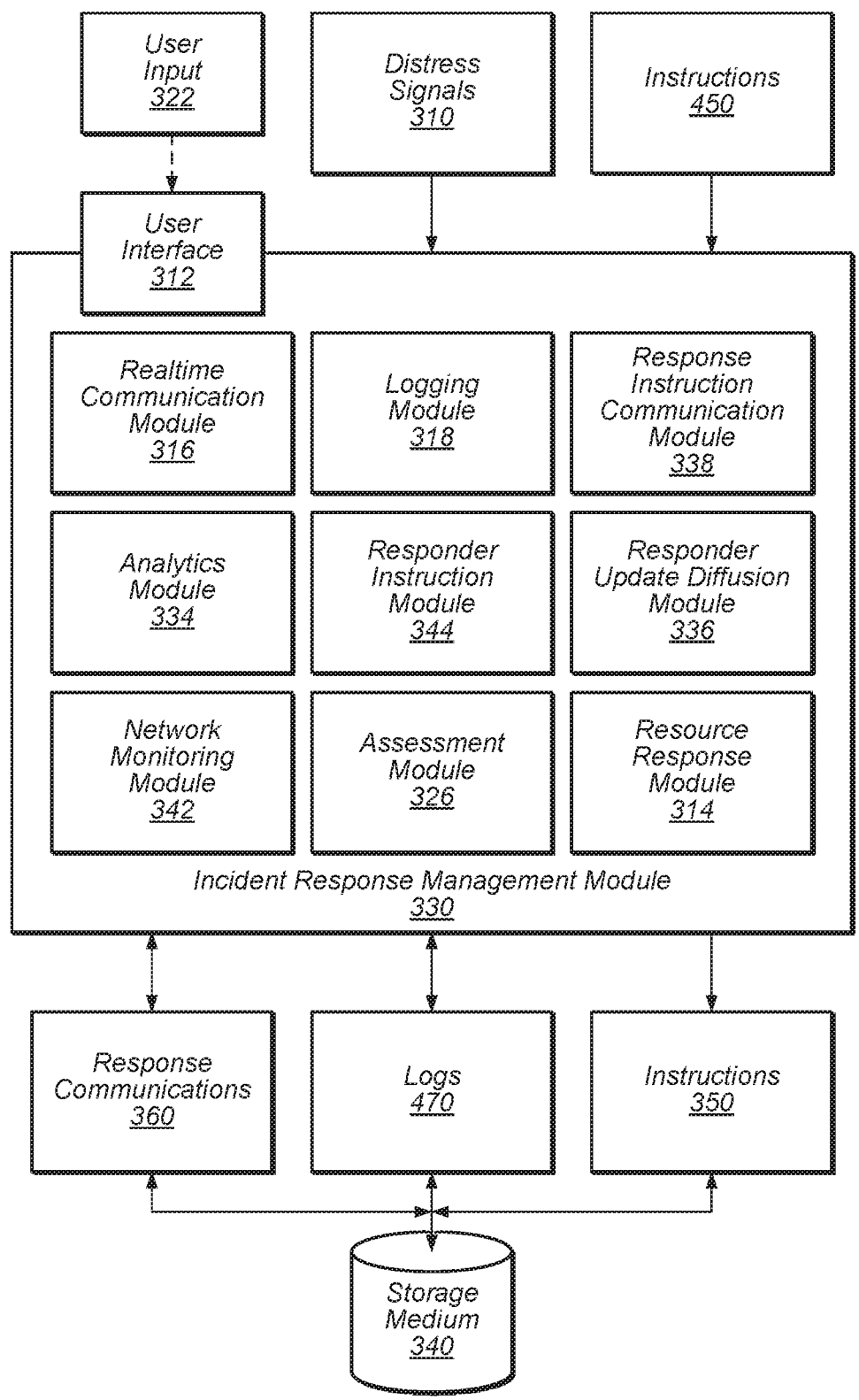
FIG. 3 illustrates a server module for facilitating automated response to a distress signal, in accordance with some embodiments.

FIG. 3 illustrates a server module for facilitating automated response to a distress signal, in accordance with some embodiments. Some embodiments include a system, such as a system hosting incident response management module 330, for facilitating automated response to one or more distress signals 310. In some embodiments, the system includes a network monitoring module 342 configured for monitoring signals received over a data network for a presence of one or more distress signals 310 transmitted over a radio-frequency network from a radio-frequency transmitter located within a housing of a multifunction mobile computing device responsive to detecting a disarticulation of an attachment from a sensor location on a multifunction mobile computing device. In some embodiments, incident response management module 330 includes an assessment module 326 configured for assessing priority of the one or more distress signals 310 transmitted over the radio-frequency network from the radio-frequency transmitter located within the housing of a multifunction mobile computing device responsive to detecting the disarticulation of an attachment from the sensor location on the multifunction mobile computing device. In some embodiments, incident response management module 330 includes a resource response module 314 configured for communicating the distress signals as response communications 360 to resources tasked to respond to the distress signals.

In some embodiments, the system includes a logging module 318 configured for receiving condition description indications from a user of the multifunction mobile computing device to for transmission with the distress signal and generating logs 342 for storage in a storage medium 340. In some embodiments, the system includes a real-time communication module 316 configured for communicating response condition description indications as response communications 360 to a user of the multifunction mobile computing device in response to the distress signal, and receiving condition description indications from a user of the multifunction mobile computing device to for transmission with the distress signal 310.

In some embodiments, the system includes a response instruction communication module 338 configured for communicating response instructions 350 to a user of the multifunction mobile computing device in response to the distress signal 310. In some embodiments, the system includes a responder update diffusion module 336 configured for communicating to the resources tasked to respond to the distress signals 310 sensor information gathered from the multifunction mobile computing device in response to the distress signal 310.

In some embodiments, the system includes an analytics module 334 configured for assessing patterns in multiple distress signals 310 and selecting appropriate responses to one or more distress signals 310. In some embodiments, the system includes a responder instruction module 344 configured for communicating instructions 350 to the resources tasked to respond to the distress signals automated instructions selected based on sensor information gathered from the multifunction mobile computing device in response to the distress signal 310. Examples of instructions 350 to the resources tasked to respond to the distress signals automated instructions selected based on sensor information gathered from the multifunction mobile computing device in response to the distress signal 310 can include maps to the location of the user or visual data relating nearby conditions. In some embodiments, the incident response management module receives user input 322 through a user interface 312.

Figure 4:
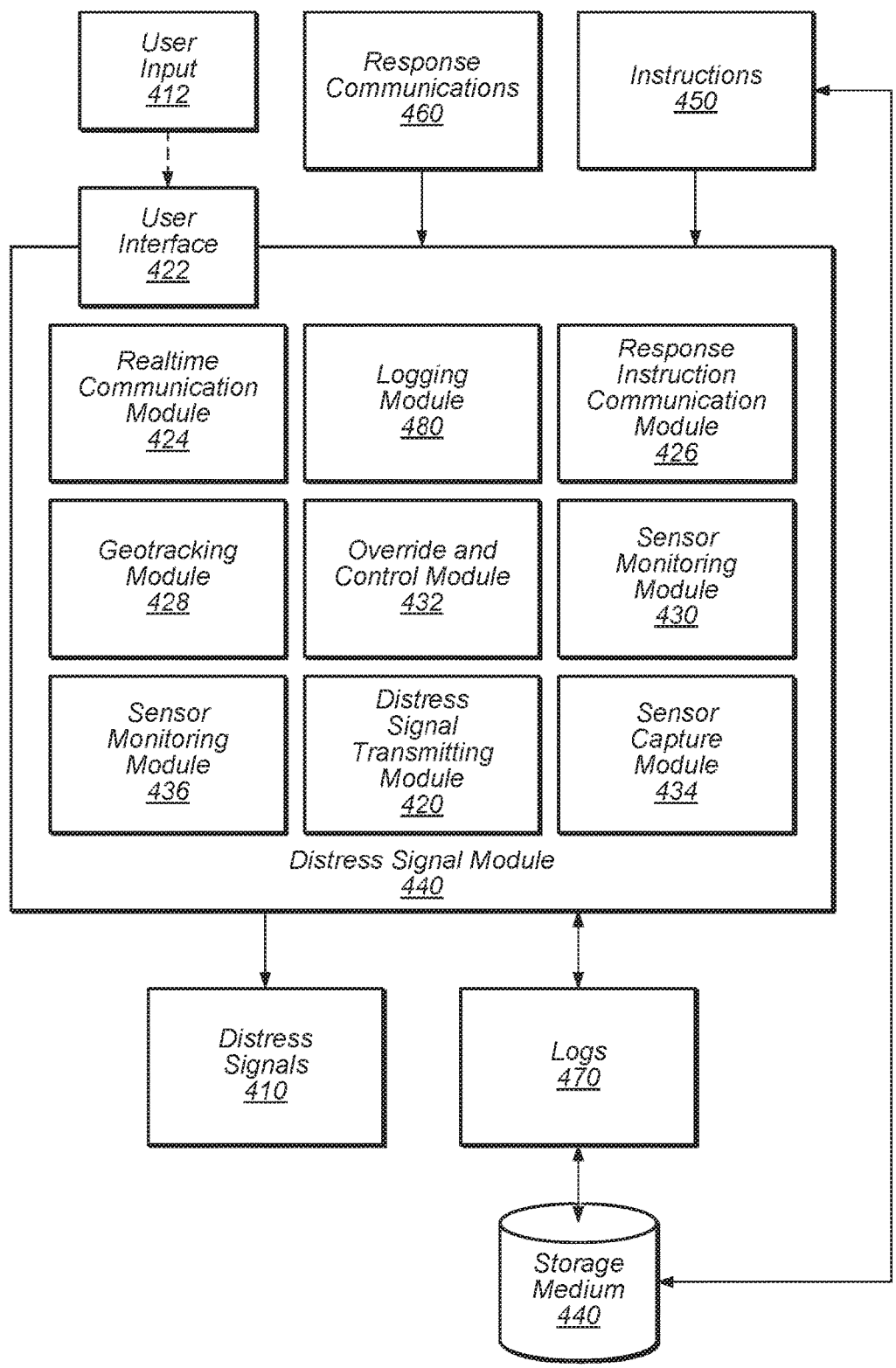
FIG. 4 illustrates a multifunction mobile computing device module for facilitating automated response to a distress signal, in accordance with some embodiments.

FIG. 4 illustrates a multifunction mobile computing device module for facilitating automated response to a distress signal, in accordance with some embodiments. Some embodiments include a system for facilitating automated response to a distress signal. In some embodiments, the system includes a housing, a sensor location coupled to the housing, a processor located within the housing, a non-transitory computer-readable storage medium, a radio-frequency transmitter located within the housing, and an attachment for the multifunction mobile computing device. In some embodiments, the attachment removably articulates to the sensor location coupled to the housing of the multifunction mobile computing device.

Some embodiments include a computer program product, such as a distress signal module 440, in the non-transitory computer-readable medium of the multifunction mobile computing device, wherein the program instructions are computer-executable to implement a sensor monitoring module 430 detecting a disarticulation of the attachment from the sensor location on the multifunction mobile computing device, and a distress signal transmitting module 420, responsive to the detecting the disarticulation of the attachment from the sensor location on the multifunction mobile computing device, a real-time communication module 424 transmitting to a distress signal response receiver over a radio-frequency network from the radio-frequency transmitter located within the housing of the multifunction mobile computing device the distress signal 410.

In some embodiments, the program instructions are further computer-executable to implement, responsive to the detecting the disarticulation of the attachment from the sensor location on the multifunction mobile computing device, presenting a user interface 422 including a distress signal control interface capable of receiving an order from a user of the multifunction mobile computing device to prevent transmission of the distress signal, and, responsive to the order from a user of the multifunction mobile computing device to prevent transmission of the distress signal, an override and control module 432 preventing transmission of the distress signal. In some embodiments, user interface 422 includes a user interface capable of receiving a touchscreen input 412 for sending a distress signal without detachment In some embodiments, the program instructions are further computer-executable to implement, responsive to the detecting the disarticulation of the attachment from the sensor location on the multifunction mobile computing device, an override and control module 432 over-riding a locked screen condition of the multifunction mobile computing device and presenting a distress signal control interface of a user interface 422 capable of receiving as user input 412 an order from a user of the multifunction mobile computing device to control parameters of transmission of the distress signal.

In some embodiments, the program instructions are further computer-executable to implement, responsive to the detecting the disarticulation of the attachment from the sensor location on the multifunction mobile computing device, an override and control module 432 over-riding a locked screen condition of the multifunction mobile computing device, and presenting a distress signal data input interface of user interface 422 capable of receiving condition description indications as user input 412 from a user of the multifunction mobile computing device for transmission with the distress signal.

In some embodiments, the program instructions are further computer-executable to implement, responsive to the detecting the disarticulation of the attachment from the sensor location on the multifunction mobile computing device, and presenting a distress signal control interface of user interface 422 capable of receiving an order from a user of the multifunction mobile computing device to prevent transmission of the distress signal. In some embodiments, the presenting the distress signal control interface of user interface 422 capable of receiving the order from a user of the multifunction mobile computing device to prevent transmission of the distress signal further includes presenting a distress signal control interface of user interface 422 capable of receiving a duress indication order from the user of the multifunction mobile computing device. In some embodiments, the program instructions are further computer-executable to implement, responsive to receiving the duress indication order from the user of the multifunction mobile computing device, indicating over a user interface 422 of the multifunction mobile computing device prevention of transmission of the distress signal, and transmitting the distress signal 410 with a duress indicator.

In some embodiments, the program instructions are further computer-executable to implement, responsive to the detecting the disarticulation of the attachment from the sensor location on the multifunction mobile computing device, a sensor monitoring module 436 capturing input data received from one or more sensors of the multifunction mobile computing device, and transmitting to the distress signal response receiver over the radio-frequency network from the radio-frequency transmitter located within the housing of the multifunction mobile computing device the input data received from the one or more sensors of the multifunction mobile computing device.

In some embodiments, the program instructions are further computer-executable to implement, responsive to the detecting the disarticulation of the attachment from the sensor location on the multifunction mobile computing device, a geotracking module 428 capturing location data describing a location of the multifunction mobile computing device, and transmitting to the distress signal response receiver over the radio-frequency network from the radio-frequency transmitter located within the housing of the multifunction mobile computing device the location data describing the location of the multifunction mobile computing device.

In some embodiments, the program instructions are further computer-executable to implement responsive to the detecting the disarticulation of the attachment from the sensor location on the multifunction mobile computing device, a sensor capture module 434 capturing input data received from one or more external sensors affiliated with the multifunction mobile computing device, logging the data as logs 470 to a storage medium 440 and transmitting to the distress signal response receiver over the radio-frequency network from the radio-frequency transmitter located within the housing of the multifunction mobile computing device the input data received from the one or more external sensors affiliated with the multifunction mobile computing device.

In some embodiments, the program instructions are further computer-executable to implement, responsive to the detecting the disarticulation of the attachment from the sensor location on the multifunction mobile computing device, a sensor capture module 434 capturing audio input data received from one or more audio sensors of the multifunction mobile computing device, and transmitting to the distress signal response receiver over the radio-frequency network from the radio-frequency transmitter located within the housing of the multifunction mobile computing device the audio input data received from the one or more audio sensors of the multifunction mobile computing device.

In some embodiments, the program instructions are further computer-executable to implement, responsive to the detecting the disarticulation of the attachment from the sensor location on the multifunction mobile computing device, a sensor capture module 434 capturing video input data received from one or more video sensors of the multifunction mobile computing device, and transmitting to the distress signal response receiver over the radio-frequency network from the radio-frequency transmitter located within the housing of the multifunction mobile computing device the video input data received from the one or more video sensors of the multifunction mobile computing device.

In some embodiments, the program instructions are further computer-executable to implement, responsive to the detecting the disarticulation of the attachment from the sensor location on the multifunction mobile computing device, a sensor capture module 434 capturing motion input data received from one or more motion sensors of the multifunction mobile computing device, and transmitting to the distress signal response receiver over the radio-frequency network from the radio-frequency transmitter located within the housing of the multifunction mobile computing device the motion input data received from the one or more motion sensors of the multifunction mobile computing device.

In some embodiments, the program instructions are further computer-executable to implement, responsive to the detecting the disarticulation of the attachment from the sensor location on the multifunction mobile computing device, a sensor capture module 434 capturing vital sign input data received from one or more vital sign sensors reporting to the multifunction mobile computing device, and transmitting to the distress signal response receiver over the radio-frequency network from the radio-frequency transmitter located within the housing of the multifunction mobile computing device the vital sign input data received from the one or more vital sign sensors reporting to the multifunction mobile computing device.

In some embodiments, the program instructions are further computer-executable to implement a real-time communication module 424 transmitting to a distress signal response receiver over a radio-frequency network from a radio-frequency transmitter located within a housing of the multifunction mobile computing device the distress signal further include program instructions computer-executable to implement a real-time communication module 424 transmitting to a distress signal response receiver over a radio-frequency network from a radio-frequency transmitter located within a housing of the multifunction mobile computing device the distress signal without presenting any visible or audible indication of the transmission of the distress signal.

In some embodiments, the program instructions are further computer-executable to implement, responsive to the detecting the disarticulation of the attachment from the sensor location on the multifunction mobile computing device, providing an audible indication of the transmission of the distress signal through a user interface 422.

In some embodiments, the program instructions are further computer-executable to implement, responsive to the detecting the disarticulation of the attachment from the sensor location on the multifunction mobile computing device, providing a vibration as an indication of the transmission of the distress signal through a user interface 422.

In some embodiments, the program instructions are further computer-executable to implement, responsive to the detecting the disarticulation of the attachment from the sensor location on the multifunction mobile computing device, providing light from a visible light source as an indication of the transmission of the distress signal through a user interface 422. Some embodiments can receive response communications 450 and instructions as described herein.

Figure 5:
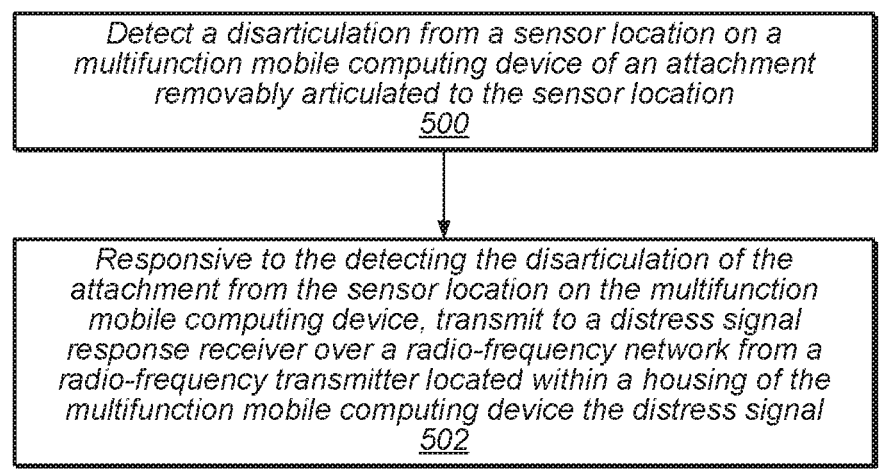
FIG. 5 is a flow diagram illustrating one embodiment of a method for facilitating automated response to a distress signal, in accordance with some embodiments.

FIG. 5 is a flow diagram illustrating one embodiment of a method for facilitating automated response to a distress signal, in accordance with some embodiments. A disarticulation from a sensor location on a multifunction mobile computing device of an attachment removably articulated to the sensor location is detected (block 500). Responsive to the detecting the disarticulation of the attachment from the sensor location on the multifunction mobile computing device, transmit a distress signal to a distress signal response server over a radio-frequency network from a radio-frequency transmitter located within a housing of the multifunction mobile computing device (block 502).

Figure 6:
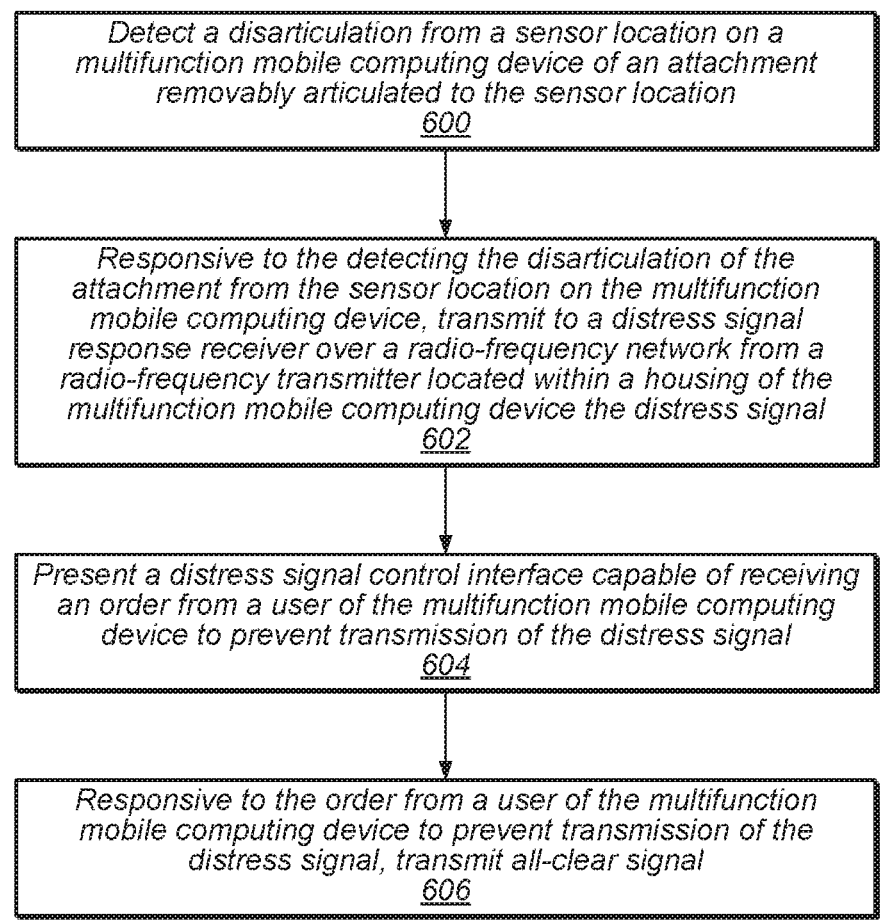
FIG. 6 is a flow diagram illustrating one embodiment of a method for facilitating automated response to a distress signal, in accordance with some embodiments.

FIG. 6 is a flow diagram illustrating one embodiment of a method for facilitating automated response to a distress signal, in accordance with some embodiments. A disarticulation from a sensor location on a multifunction mobile computing device of an attachment removably articulated to the sensor location is detected (block 600). Responsive to the detecting the disarticulation of the attachment from the sensor location on the multifunction mobile computing device, transmit a distress signal to a distress signal response server over a radio-frequency network from a radio-frequency transmitter located within a housing of the multifunction mobile computing device (block 502). A distress signal control interface capable of receiving an order from a user of the multifunction mobile computing device to prevent transmission of the distress signal is presented (block 604). Responsive to the order from a user of the multifunction mobile computing device to prevent transmission of the distress signal, an all-clear signal is transmitted (block 606).

Figure 7:
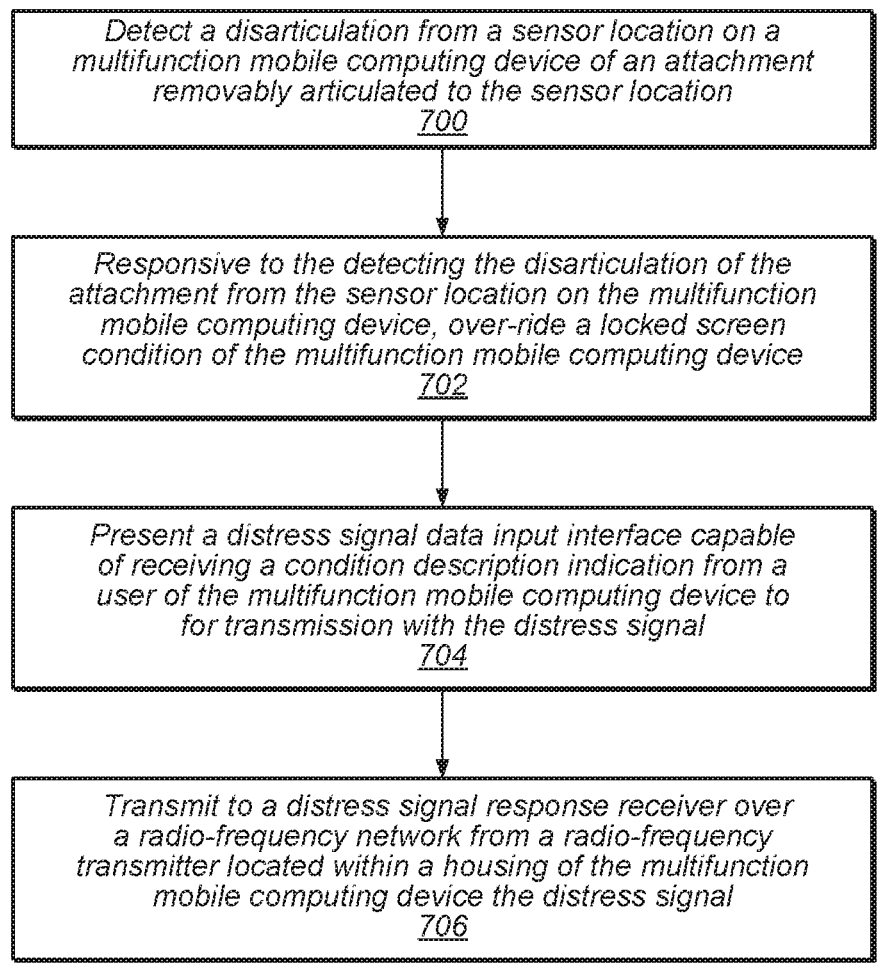
FIG. 7 is a flow diagram illustrating one embodiment of a method for facilitating automated response to a distress signal, in accordance with some embodiments.

FIG. 7 is a flow diagram illustrating one embodiment of a method for facilitating automated response to a distress signal, in accordance with some embodiments. A disarticulation from a sensor location on a multifunction mobile computing device of an attachment removably articulated to the sensor location is detected (block 700). Responsive to the detecting the disarticulation of the attachment from the sensor location on the multifunction mobile computing device, a locked screen condition of the multifunction mobile computing device is over-ridden (block 702). A distress signal data input interface capable of receiving a condition description indications from a user of the multifunction mobile computing device for transmission with the distress signal is presented (block 704). The distress signal is transmitted to a distress signal response receiver over a radio-frequency network from a radio-frequency transmitter located within a housing of the multifunction mobile computing device (block 706).

Figure 8:
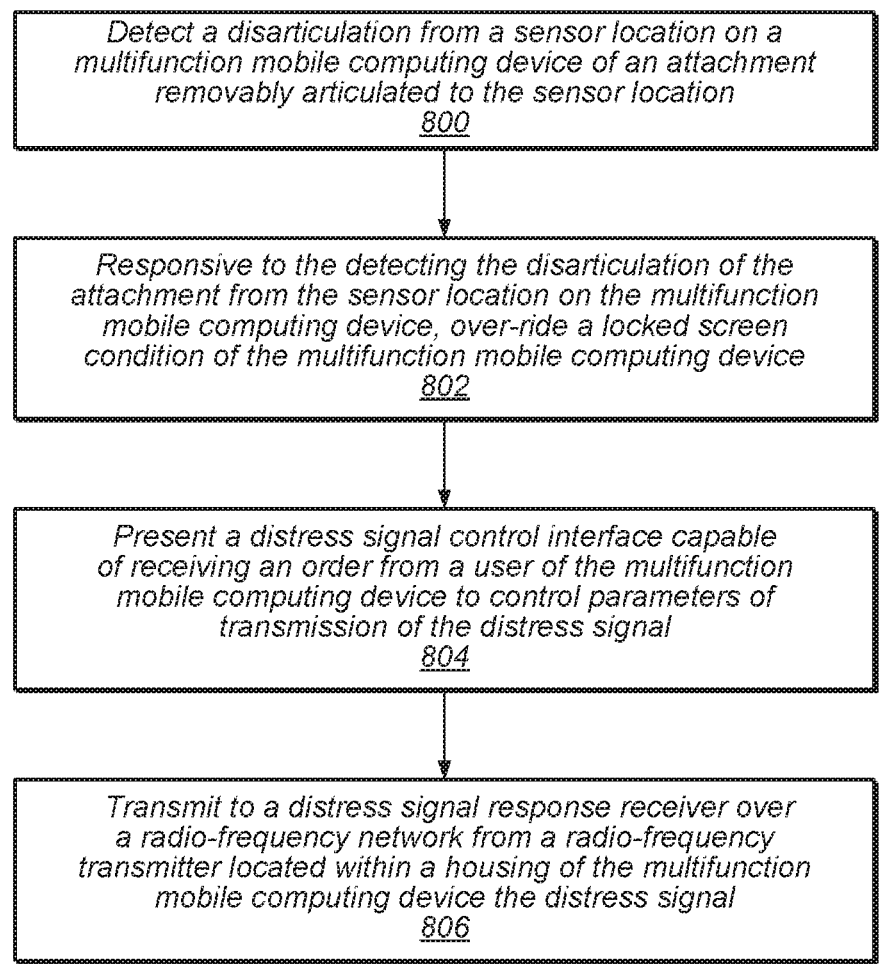
FIG. 8 is a flow diagram illustrating one embodiment of a method for facilitating automated response to a distress signal, in accordance with some embodiments.

FIG. 8 is a flow diagram illustrating one embodiment of a method for facilitating automated response to a distress signal, in accordance with some embodiments. A disarticulation from a sensor location on a multifunction mobile computing device of an attachment removably articulated to the sensor location is detected (block 800). Responsive to the detecting the disarticulation of the attachment from the sensor location on the multifunction mobile computing device, a locked screen condition of the multifunction mobile computing device is over-ridden (block 802). A distress signal control interface capable of receiving an order from a user of the multifunction mobile computing device to control parameters of transmission of the distress signal is presented (block 804). The distress signal is transmitted to a distress signal response receiver over a public radio-frequency network from a radio-frequency transmitter located within a housing of the multifunction mobile computing device (block 806).

Figure 9:
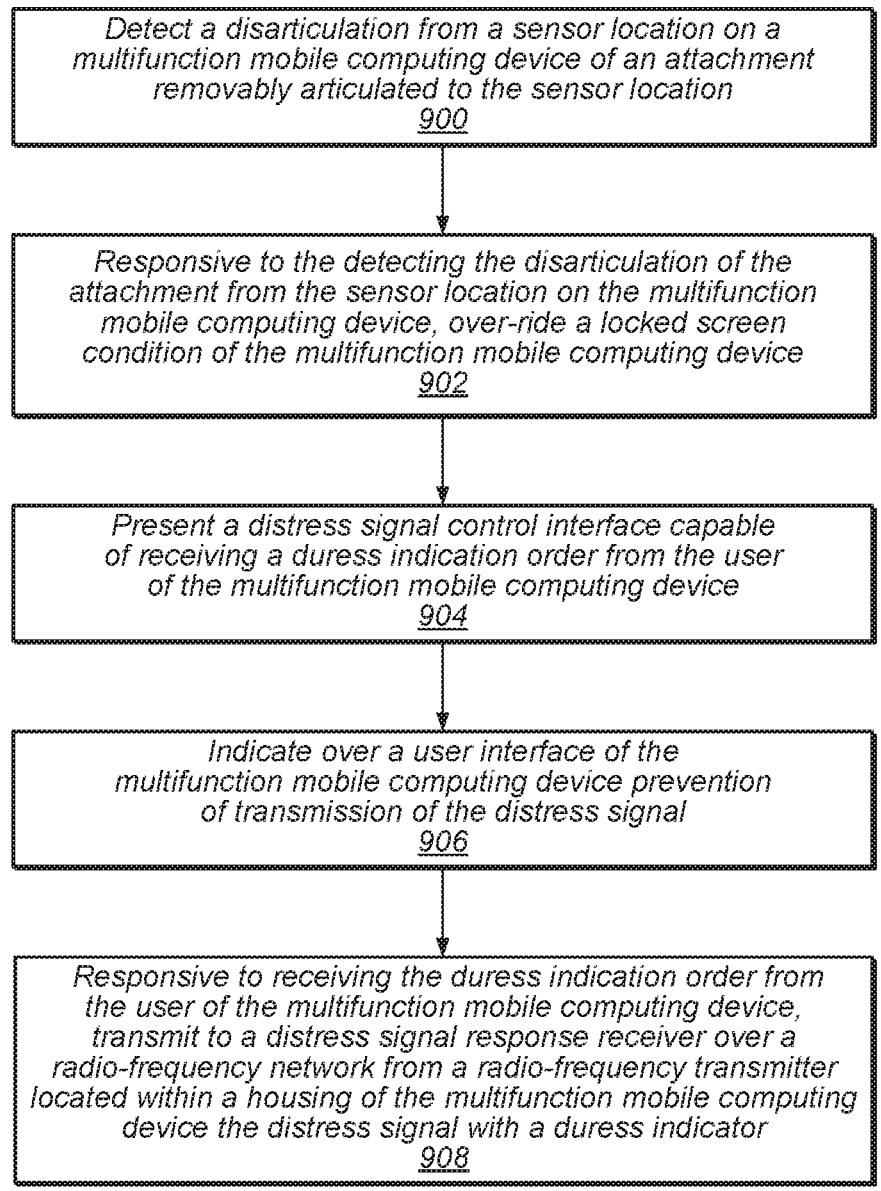
FIG. 9 is a flow diagram illustrating one embodiment of a method for facilitating automated response to a distress signal, in accordance with some embodiments.

FIG. 9 is a flow diagram illustrating one embodiment of a method for facilitating automated response to a distress signal, in accordance with some embodiments. A disarticulation from a sensor location on a multifunction mobile computing device of an attachment removably articulated to the sensor location is detected (block 900). Responsive to the detecting the disarticulation of the attachment from the sensor location on the multifunction mobile computing device, a locked screen condition of the multifunction mobile computing device is over-ridden (block 902). A distress signal control interface capable of receiving a duress indication order from the user of the multifunction mobile computing device is presented (block 904). An indication of prevention of transmission of the distress signal is presented over a user interface of the multifunction mobile computing device (block 906). Responsive to receiving the duress indication order from the user of the multifunction mobile computing device, the distress signal is transmitted with a duress indicator to a distress signal response receiver over a public radio-frequency network from a radio-frequency transmitter located within a housing of the multifunction mobile computing device (block 908).

Figure 10:
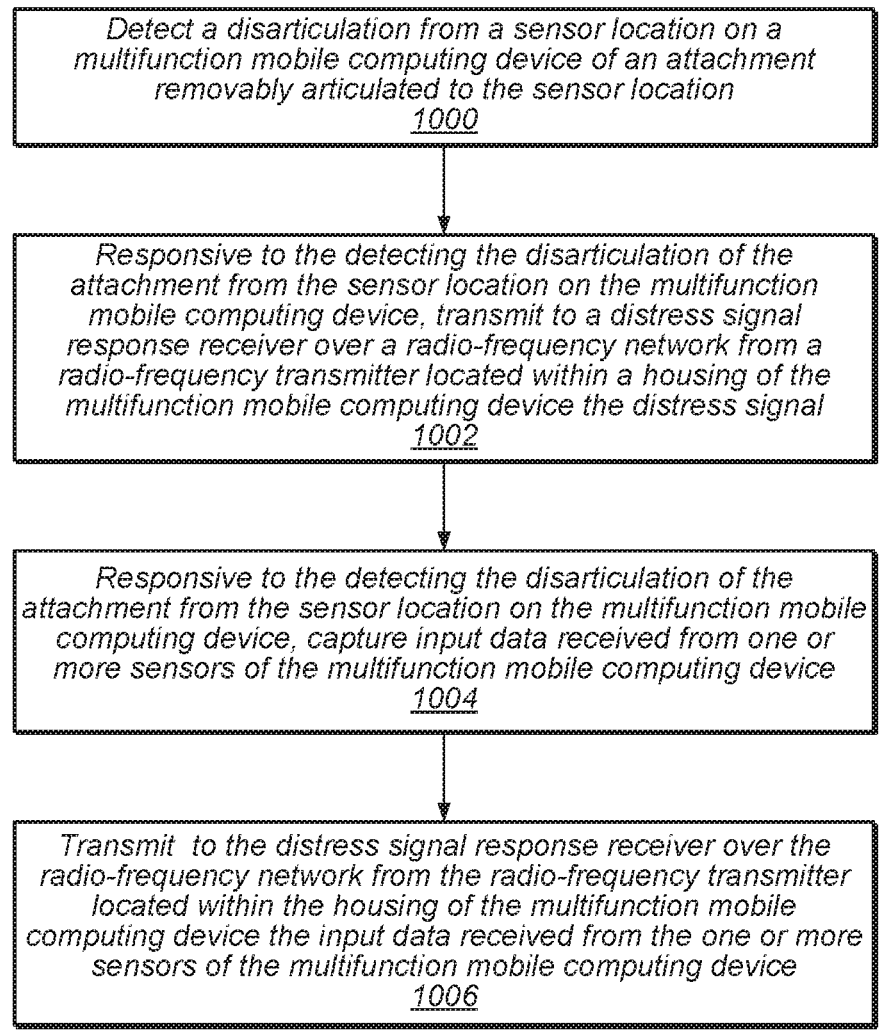
FIG. 10 is a flow diagram illustrating one embodiment of a method for facilitating automated response to a distress signal, in accordance with some embodiments.

FIG. 10 is a flow diagram illustrating one embodiment of a method for facilitating automated response to a distress signal, in accordance with some embodiments. A disarticulation from a sensor location on a multifunction mobile computing device of an attachment removably articulated to the sensor location is detected (block 1000). Responsive to the detecting the disarticulation of the attachment from the sensor location on the multifunction mobile computing device, transmit to a distress signal response receiver over a public radio-frequency network from a radio-frequency transmitter located within a housing of the multifunction mobile computing device the distress signal (block 1002). Responsive to the detecting the disarticulation of the attachment from the sensor location on the multifunction mobile computing device, input data received from one or more sensors of the multifunction mobile computing device is captured (block 1004). The input data received from the one or more sensors of the multifunction mobile computing device is transmitted from the radio-frequency transmitter located within the housing of the multifunction mobile computing device (block 1006).

Figure 11:
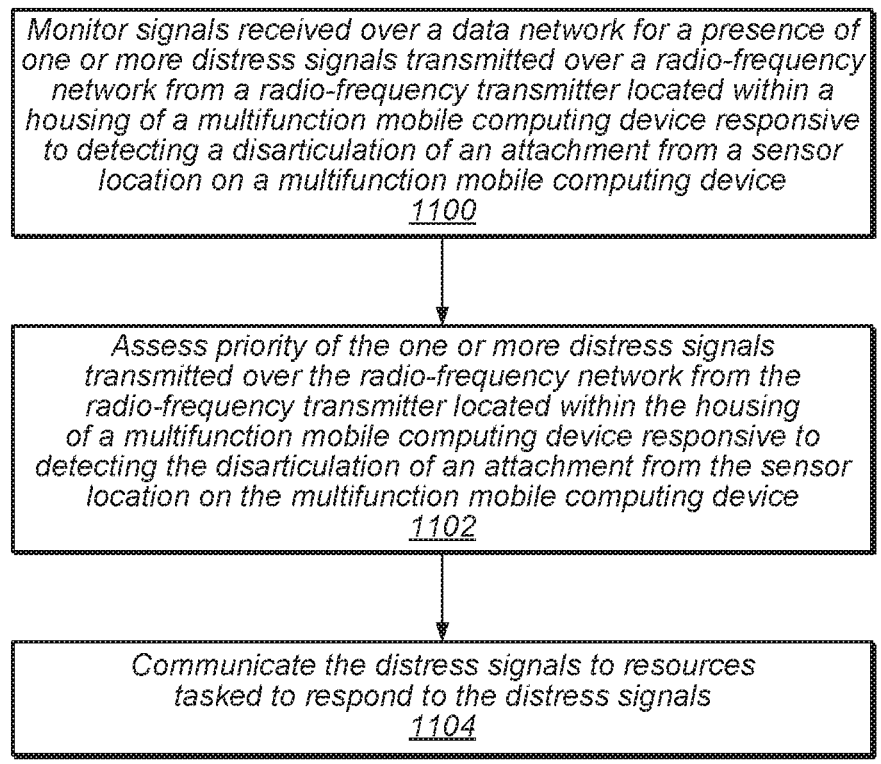
FIG. 11 is a flow diagram illustrating one embodiment of a method for facilitating automated response to a distress signal, in accordance with some embodiments.

FIG. 11 is a flow diagram illustrating one embodiment of a method for facilitating automated response to a distress signal, in accordance with some embodiments. Signals received over a data network are monitored for a presence of one or more distress signals transmitted over a radio-frequency network from a radio-frequency transmitter located within a housing of a multifunction mobile computing device responsive to detecting a disarticulation of an attachment from a sensor location on a multifunction mobile computing device (block 1100). Priority of the one or more distress signals transmitted over the radio-frequency network from the radio-frequency transmitter located within the housing of a multifunction mobile computing device responsive to detecting the disarticulation of an attachment from the sensor location on the multifunction mobile computing device is assessed (block 1102). The distress signals are communicated to resources tasked to respond to the distress signals (block 1104).

Figure 12:
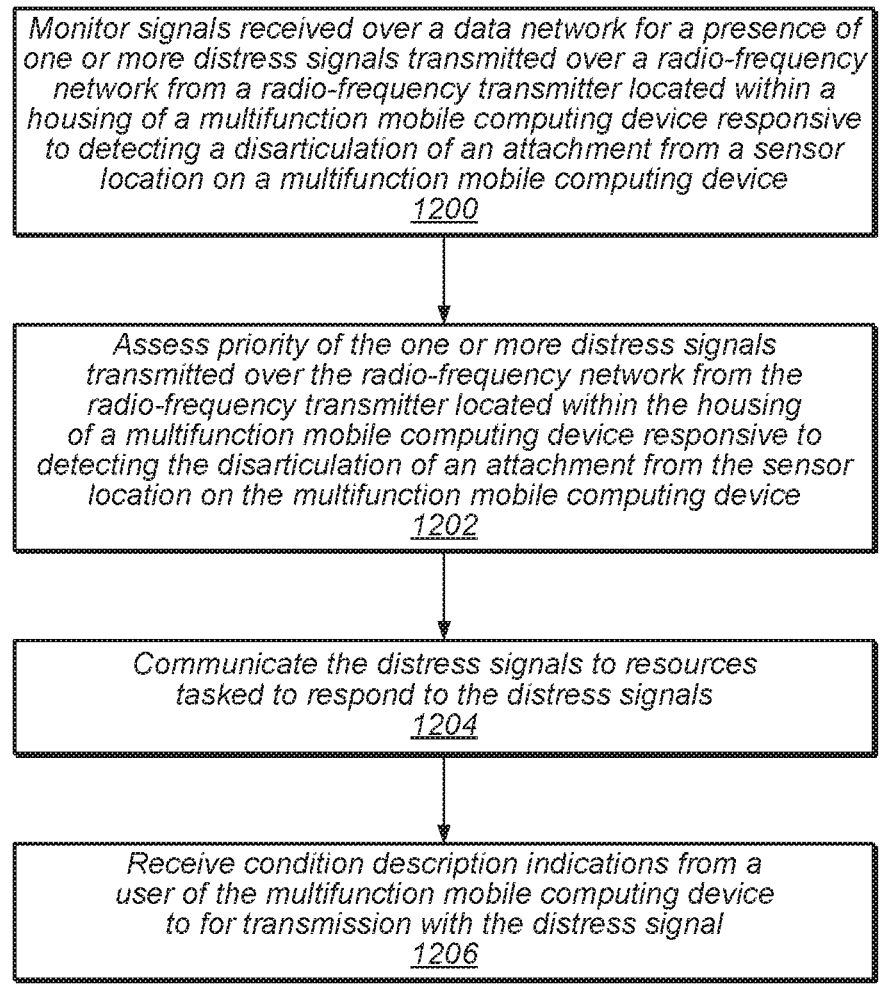
FIG. 12 is a flow diagram illustrating one embodiment of a method for facilitating automated response to a distress signal, in accordance with some embodiments.

FIG. 12 is a flow diagram illustrating one embodiment of a method for facilitating automated response to a distress signal, in accordance with some embodiments. Signals received over a data network are monitored for a presence of one or more distress signals transmitted over a radio-frequency network from a radio-frequency transmitter located within a housing of a multifunction mobile computing device responsive to detecting a disarticulation of an attachment from a sensor location on a multifunction mobile computing device (block 1200). Priority of the one or more distress signals transmitted over the radio-frequency network from the radio-frequency transmitter located within the housing of a multifunction mobile computing device responsive to detecting the disarticulation of an attachment from the sensor location on the multifunction mobile computing device is assessed (block 1202). The distress signals are communicated to resources tasked to respond to the distress signals (block 1204). Condition description indications for transmission with the distress signal are received from a user of the multifunction mobile computing device (block 1206).

Figure 13:
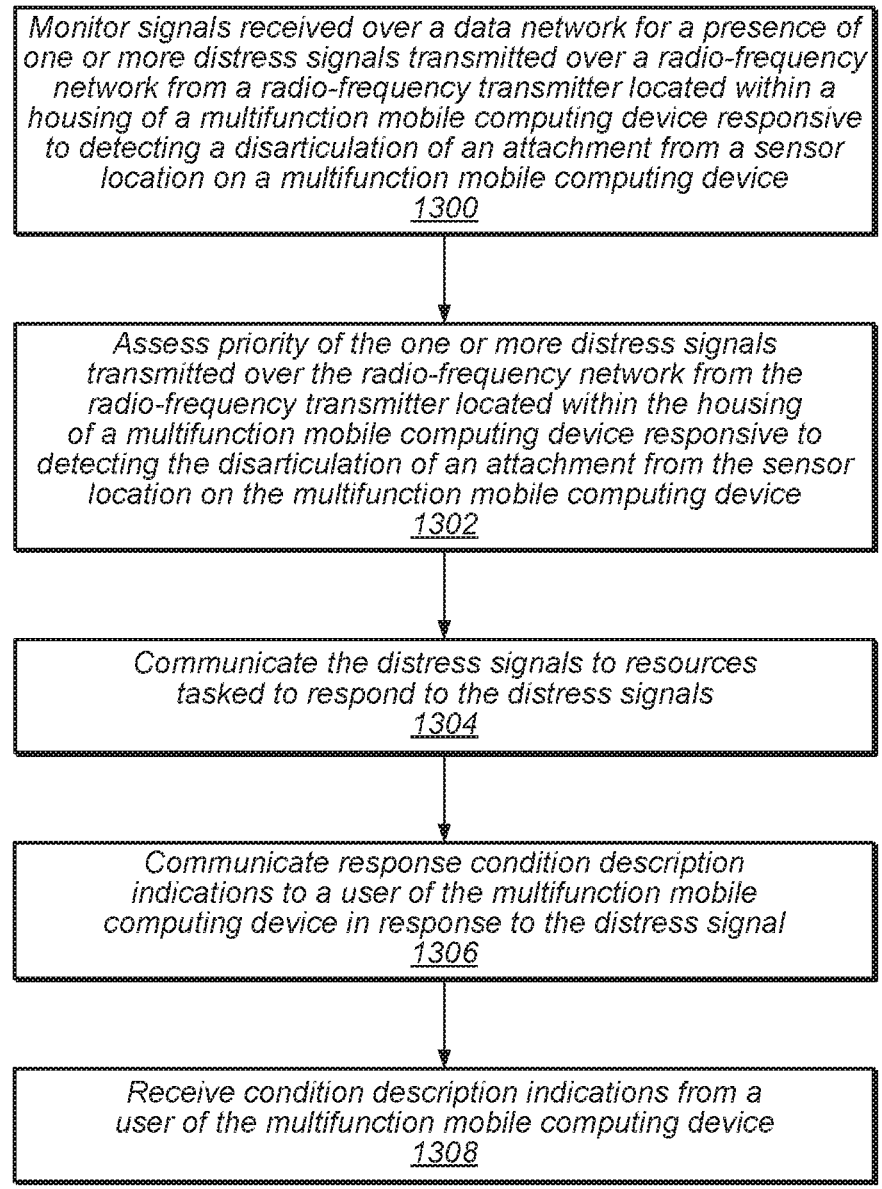
FIG. 13 is a flow diagram illustrating one embodiment of a method for facilitating automated response to a distress signal, in accordance with some embodiments.

FIG. 13 is a flow diagram illustrating one embodiment of a method for facilitating automated response to a distress signal, in accordance with some embodiments. Signals received over a data network are monitored for a presence of one or more distress signals transmitted over a radio-frequency network from a radio-frequency transmitter located within a housing of a multifunction mobile computing device responsive to detecting a disarticulation of an attachment from a sensor location on a multifunction mobile computing device (block 1300). Priority of the one or more distress signals transmitted over the radio-frequency network from the radio-frequency transmitter located within the housing of a multifunction mobile computing device responsive to detecting the disarticulation of an attachment from the sensor location on the multifunction mobile computing device is assessed (block 1302). The distress signals are communicated to resources tasked to respond to the distress signals (block 1304). Response condition description indications are communicated to a user of the multifunction mobile computing device in response to the distress signal (block 1306). Condition description indications for transmission with the distress signal are received from a user of the multifunction mobile computing device (block 1308).

Figure 14:
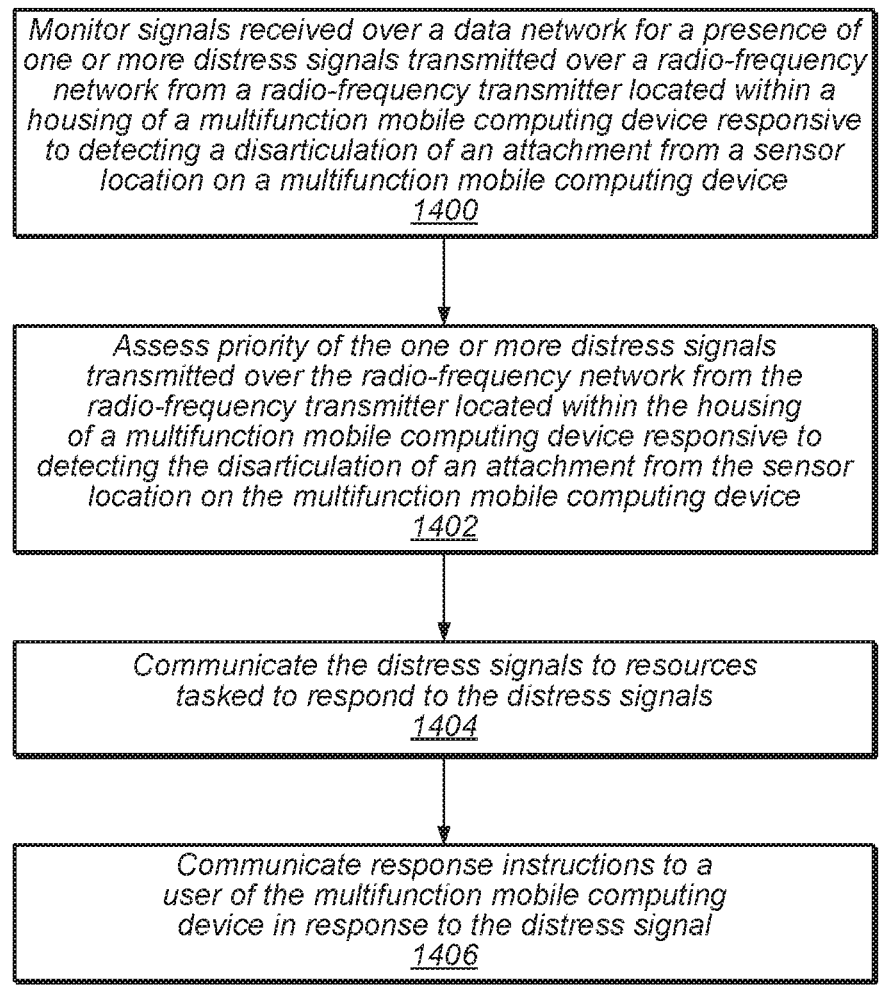
FIG. 14 is a flow diagram illustrating one embodiment of a method for facilitating automated response to a distress signal, in accordance with some embodiments.

FIG. 14 is a flow diagram illustrating one embodiment of a method for facilitating automated response to a distress signal, in accordance with some embodiments. Signals received over a data network are monitored for a presence of one or more distress signals transmitted over a radio-frequency network from a radio-frequency transmitter located within a housing of a multifunction mobile computing device responsive to detecting a disarticulation of an attachment from a sensor location on a multifunction mobile computing device (block 1400). Priority of the one or more distress signals transmitted over the radio-frequency network from the radio-frequency transmitter located within the housing of a multifunction mobile computing device responsive to detecting the disarticulation of an attachment from the sensor location on the multifunction mobile computing device is assessed (block 1402). The distress signals are communicated to resources tasked to respond to the distress signals (block 1404). Response instructions are communicated to a user of the multifunction mobile computing device in response to the distress signal (block 1406).

Figure 15:
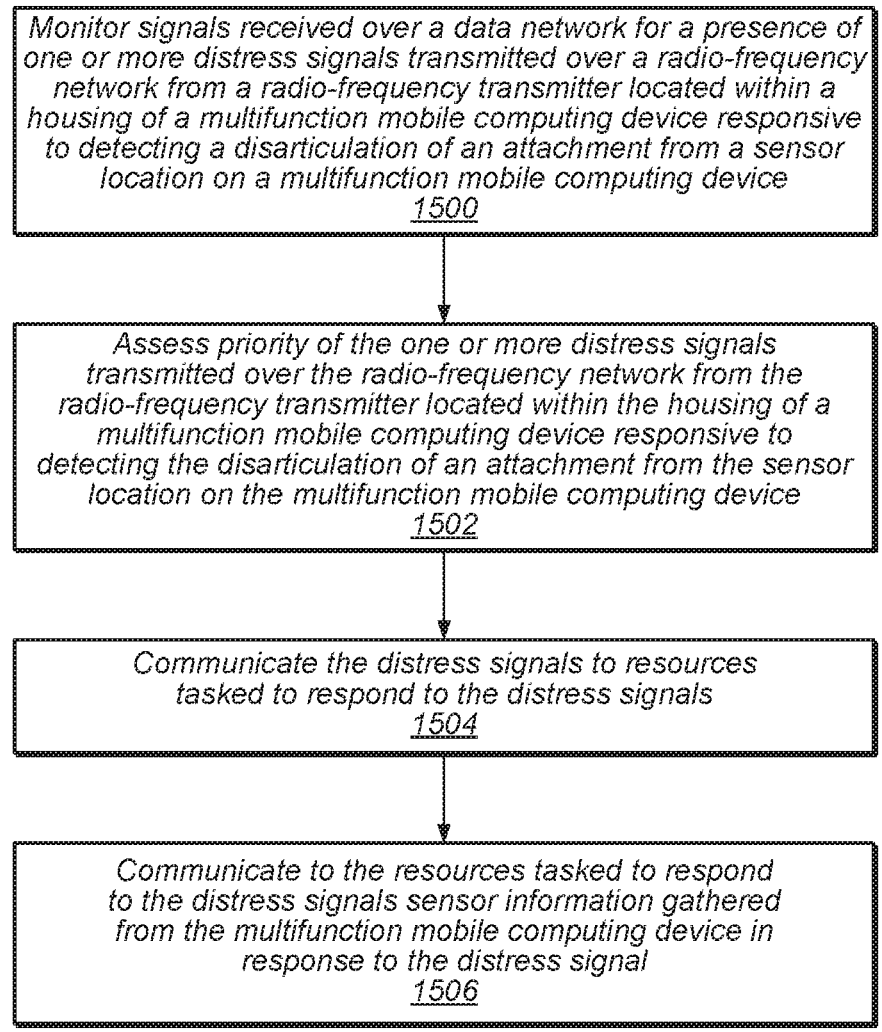
FIG. 15 is a flow diagram illustrating one embodiment of a method for facilitating automated response to a distress signal, in accordance with some embodiments.

FIG. 15 is a flow diagram illustrating one embodiment of a method for facilitating automated response to a distress signal, in accordance with some embodiments. Signals received over a data network are monitored for a presence of one or more distress signals transmitted over a radio-frequency network from a radio-frequency transmitter located within a housing of a multifunction mobile computing device responsive to detecting a disarticulation of an attachment from a sensor location on a multifunction mobile computing device (block 1500). Priority of the one or more distress signals transmitted over the radio-frequency network from the radio-frequency transmitter located within the housing of a multifunction mobile computing device responsive to detecting the disarticulation of an attachment from the sensor location on the multifunction mobile computing device is assessed (block 1502). The distress signals are communicated to resources tasked to respond to the distress signals (block 1504). Sensor information gathered from the multifunction mobile computing device in response to the distress signal is communicated to the resources tasked to respond to the distress signals (block 1506).

Figure 16:
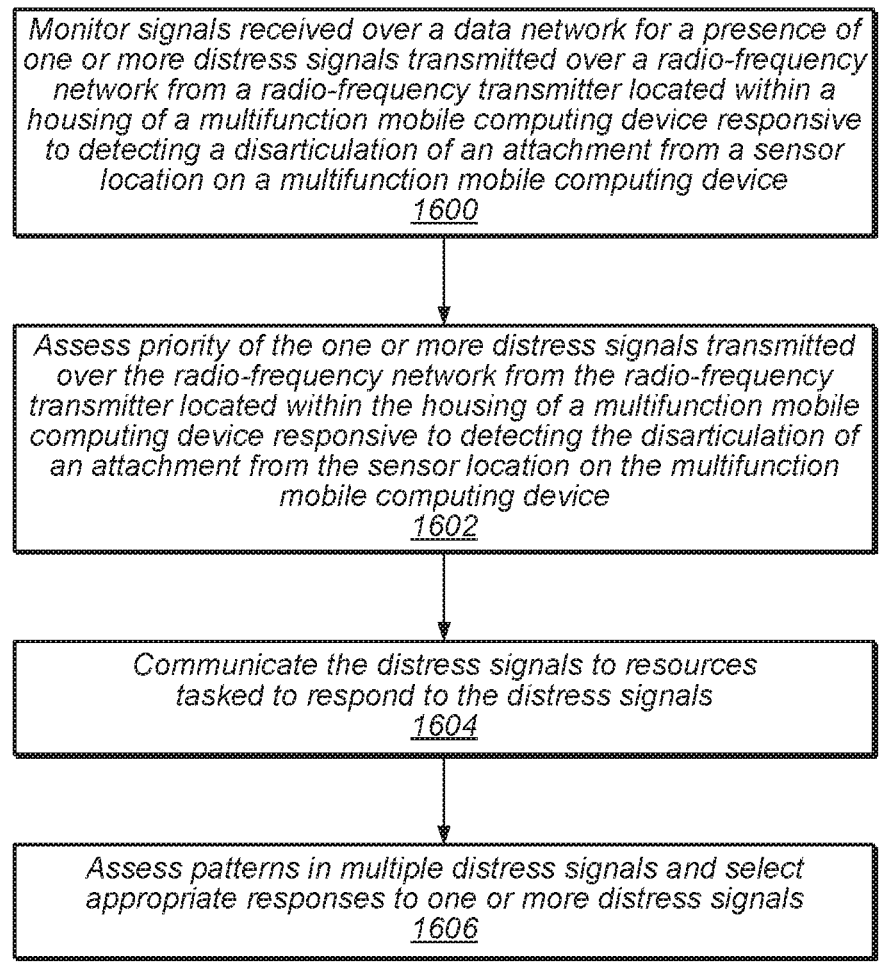
FIG. 16 is a flow diagram illustrating one embodiment of a method for facilitating automated response to a distress signal, in accordance with some embodiments.

FIG. 16 is a flow diagram illustrating one embodiment of a method for facilitating automated response to a distress signal, in accordance with some embodiments. Signals received over a data network are monitored for a presence of one or more distress signals transmitted over a radio-frequency network from a radio-frequency transmitter located within a housing of a multifunction mobile computing device responsive to detecting a disarticulation of an attachment from a sensor location on a multifunction mobile computing device (block 1600). Priority of the one or more distress signals transmitted over the radio-frequency network from the radio-frequency transmitter located within the housing of a multifunction mobile computing device responsive to detecting the disarticulation of an attachment from the sensor location on the multifunction mobile computing device is assessed (block 1602). The distress signals are communicated to resources tasked to respond to the distress signals (block 1604). Patterns in multiple distress signals are assessed and appropriate responses to one or more distress signals are selected (block 1606).

Figure 17:
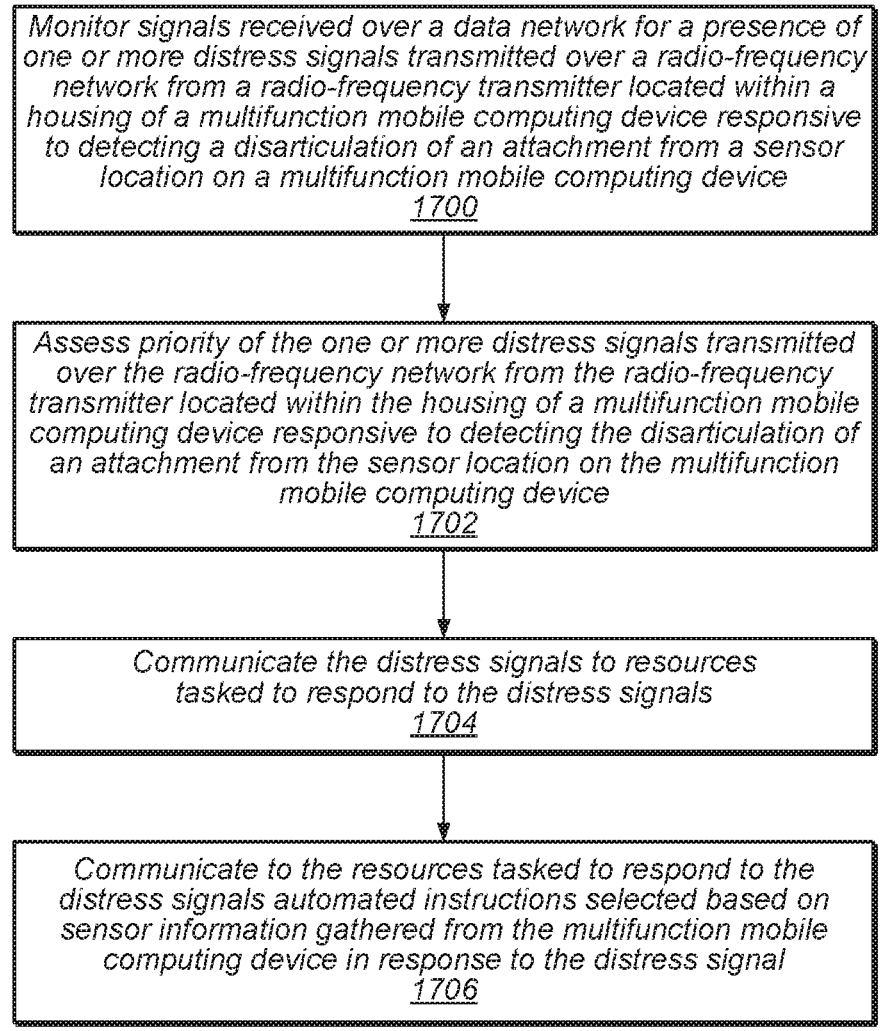
FIG. 17 is a flow diagram illustrating one embodiment of a method for facilitating automated response to a distress signal, in accordance with some embodiments.

FIG. 17 is a flow diagram illustrating one embodiment of a method for facilitating automated response to a distress signal, in accordance with some embodiments. Signals received over a data network are monitored for a presence of one or more distress signals transmitted over a radio-frequency network from a radio-frequency transmitter located within a housing of a multifunction mobile computing device responsive to detecting a disarticulation of an attachment from a sensor location on a multifunction mobile computing device (block 1700). Priority of the one or more distress signals transmitted over the radio-frequency network from the radio-frequency transmitter located within the housing of a multifunction mobile computing device responsive to detecting the disarticulation of an attachment from the sensor location on the multifunction mobile computing device is assessed (block 1702). The distress signals are communicated to resources tasked to respond to the distress signals (block 1704). Automated instructions selected based on sensor information gathered from the multifunction mobile computing device in response to the distress signal is communicated to the resources tasked to respond to the distress signals (block 1706).

Example Computer System

Figure 18:
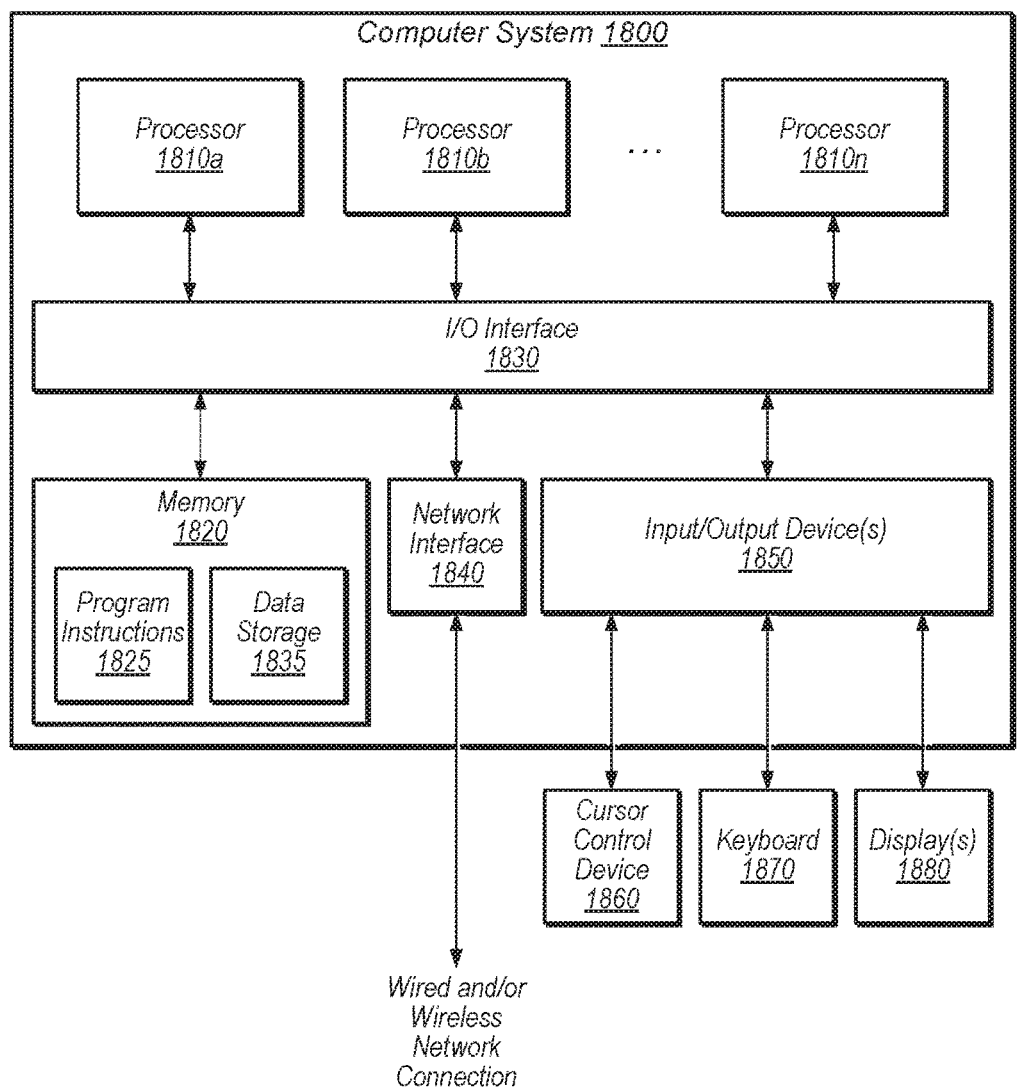
FIG. 18 illustrates an example computer system configured to implement aspects of the system and method for facilitating automated response to a distress signal, in accordance with some embodiments.

FIG. 18 illustrates an example computer system configured to implement aspects of the system and method for facilitating automated response to a distress signal, in accordance with some embodiments. FIG. 18 illustrates computer system 1800 that is configured to execute any or all of the embodiments described above. In different embodiments, computer system 1800 may be any of various types of devices, including, but not limited to, a computer embedded in a vehicle, a computer embedded in an appliance, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a system and method for negotiating control of a shared audio or visual resource, as described herein, may be executed on one or more computer systems 1800, which may interact with various other devices. Note that any component, action, or functionality described above with respect to FIGS. 1-5 may be implemented on one or more computers configured as computer system 1800 of FIG. 18, according to various embodiments. In the illustrated embodiment, computer system 1800 includes one or more processors 1810 coupled to a system memory 1820 via an input/output (I/O) interface 1830. Computer system 1800 further includes a network interface 1840 coupled to I/O interface 1830, and one or more input/output devices 1850, such as cursor control device 1860, keyboard 1870, and display(s) 1880. In some cases, it is contemplated that embodiments may be implemented using a single instance of computer system 1800, while in other embodiments multiple such systems, or multiple nodes making up computer system 1800, may be configured to host different portions or instances of embodiments. For example, in one embodiment some elements may be implemented via one or more nodes of computer system 1800 that are distinct from those nodes implementing other elements.

In various embodiments, computer system 1800 may be a uniprocessor system including one processor 1810, or a multiprocessor system including several processors 1810 (e.g., two, four, eight, or another suitable number). Processors 1810 may be any suitable processor capable of executing instructions. For example, in various embodiments processors 1810 may be general-purpose or embedded processors implementing any of a variety of instruction set architectures (ISAs), such as the x86, PowerPC, SPARC, or MIPS ISAs, or any other suitable ISA. In multiprocessor systems, each of processors 1810 may commonly, but not necessarily, implement the same ISA.

System memory 1820 may be configured to store program instructions 1822 and/or existing state information and ownership transition condition data 1832 accessible by processor 1810. In various embodiments, system memory 1820 may be implemented using any suitable memory technology, such as static random access memory (SRAM), synchronous dynamic RAM (SDRAM), nonvolatile/Flash-type memory, or any other type of memory. In the illustrated embodiment, program instructions 1822 may be configured to implement a mapping application 1824 incorporating any of the functionality described above. Additionally, existing state information and ownership transition condition data 1832 of memory 1820 may include any of the information or data structures described above. In some embodiments, program instructions and/or data may be received, sent or stored upon different types of computer-accessible media or on similar media separate from system memory 1820 or computer system 1800. While computer system 1800 is described as implementing the functionality of functional blocks of previous Figures, any of the functionality described herein may be implemented via such a computer system.

In one embodiment, I/O interface 1830 may be configured to coordinate I/O traffic between processor 1810, system memory 1820, and any peripheral devices in the device, including network interface 1840 or other peripheral interfaces, such as input/output devices 1850. In some embodiments, I/O interface 1830 may perform any necessary protocol, timing or other data transformations to convert data signals from one component (e.g., system memory 1820) into a format suitable for use by another component (e.g., processor 1810). In some embodiments, I/O interface 1830 may include support for devices attached through various types of peripheral buses, such as a variant of the Peripheral Component Interconnect (PCI) bus standard or the Universal Serial Bus (USB) standard, for example. In some embodiments, the function of I/O interface 1830 may be split into two or more separate components, such as a north bridge and a south bridge, for example. Also, in some embodiments some or all of the functionality of I/O interface 1830, such as an interface to system memory 1820, may be incorporated directly into processor 1810.

Network interface 1840 may be configured to allow data to be exchanged between computer system 1800 and other devices attached to a network 1885 (e.g., carrier or agent devices) or between nodes of computer system 1800. Network 1885 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1850 may, in some embodiments, include one or more display terminals, keyboards, keypads, touchpads, scanning devices, voice or optical recognition devices, or any other devices suitable for entering or accessing data by one or more computer systems 1800. Multiple input/output devices 1850 may be present in computer system 1800 or may be distributed on various nodes of computer system 1800. In some embodiments, similar input/output devices may be separate from computer system 1800 and may interact with one or more nodes of computer system 1800 through a wired or wireless connection, such as over network interface 1840.

As shown in FIG. 18, memory 1820 may include program instructions 1822, which may be processor-executable to implement any element or action described above. In one embodiment, the program instructions may implement the methods described above, such as the methods illustrated by FIG. 5-17. In other embodiments, different elements and data may be included. Note that data 1832 may include any data or information described above.

Those skilled in the art will appreciate that computer system 1800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1800 may be transmitted to computer system 1800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

Multifunction Mobile Computing Device

Embodiments of electronic devices, user interfaces for such devices, and associated processes for using such devices are described. In some embodiments, the device is a portable communications device, such as a mobile telephone, that also contains other functions, such as PDA and/or music player functions. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices. FIG. 199 is a block diagram illustrating multifunction mobile computing device 1900 with touch-sensitive displays 19192 in accordance with some embodiments. Touch-sensitive display 19192 is sometimes called a "touch screen" for convenience, and may also be known as or called a touch-sensitive display system. Device 1900 may include memory 1902 (which may include one or more computer readable storage mediums), memory controller 1922, one or more processing units (CPU's) 1920, peripherals interface 19198, RF circuitry 1908, audio circuitry 19190, speaker 191919, microphone 19193, input/output (I/O) subsystem 1906, other input or control devices 19196, and external port 1924. Device 1900 may include one or more optical sensors 1964. These components may communicate over one or more communication buses or signal lines 1903.

It should be appreciated that device 1900 is only one example of a portable multifunction device, and that device 1900 may have more or fewer components than shown, may combine two or more components, or may have a different configuration or arrangement of the components. The various components shown in FIG. 19 may be implemented in hardware, software, or a combination of hardware and software, including one or more signal processing and/or application specific integrated circuits.

Memory 1902 may include high-speed random access memory and may also include non-volatile memory, such as one or more magnetic disk storage devices, flash memory devices, or other non-volatile solid-state memory devices. Access to memory 1902 by other components of device 1900, such as CPU 1920 and the peripherals interface 19198, may be controlled by memory controller 1922.

Peripherals interface 19198 can be used to couple input and output peripherals of the device to CPU 1920 and memory 1902. The one or more processors 1920 run or execute various software programs and/or sets of instructions stored in memory 1902 to perform various functions for device 1900 and to process data.

In some embodiments, peripherals interface 19198, CPU 1920, and memory controller 1922 may be implemented on a single chip, such as chip 1904. In some other embodiments, they may be implemented on separate chips.

RF (radio frequency) circuitry 1908 receives and sends RF signals, also called electromagnetic signals. RF circuitry 1908 converts electrical signals to/from electromagnetic signals and communicates with communications networks and other communications devices via the electromagnetic signals. RF circuitry 1908 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1908 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.1919a, IEEE 802.1919b, IEEE 802.1919g and/or IEEE 802.1919n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 19190, speaker 191919, and microphone 19193 provide an audio interface between a user and device 1900. Audio circuitry 19190 receives audio data from peripherals interface 19198, converts the audio data to an electrical signal, and transmits the electrical signal to speaker 191919. Speaker 191919 converts the electrical signal to human-audible sound waves. Audio circuitry 19190 also receives electrical signals converted by microphone 19193 from sound waves. Audio circuitry 19190 converts the electrical signal to audio data and transmits the audio data to peripherals interface 19198 for processing. Audio data may be retrieved from and/or transmitted to memory 1902 and/or RF circuitry 1908 by peripherals interface 19198. In some embodiments, audio circuitry 19190 also includes a headset jack (e.g., 2192, FIG. 2). The headset jack provides an interface between audio circuitry 19190 and removable audio input/output peripherals, such as output-only headphones or a headset with both output (e.g., a headphone for one or both ears) and input (e.g., a microphone).

I/O subsystem 1906 couples input/output peripherals on device 1900, such as touch screen 19192 and other input control devices 19196, to peripherals interface 19198. I/O subsystem 1906 may include display controller 1956 and one or more input controllers 1960 for other input or control devices. The one or more input controllers 1960 receive/send electrical signals from/to other input or control devices 19196. The other input control devices 19196 may include physical buttons (e.g., push buttons, rocker buttons, etc.), dials, slider switches, joysticks, click wheels, and so forth. In some alternate embodiments, input controller(s) 1960 may be coupled to any (or none) of the following: a keyboard, infrared port, USB port, and a pointer device such as a mouse. The one or more buttons (e.g., 208, FIG. 2) may include an up/down button for volume control of speaker 191919 and/or microphone 19193. The one or more buttons may include a push button (e.g., 206, FIG. 2).

Touch-sensitive display 19192 provides an input interface and an output interface between the device and a user. Display controller 1956 receives and/or sends electrical signals from/to touch screen 19192. Touch screen 19192 displays visual output to the user. The visual output may include graphics, text, icons, video, and any combination thereof (collectively termed "graphics"). In some embodiments, some or all of the visual output may correspond to user-interface objects.

Touch screen 19192 has a touch-sensitive surface, sensor or set of sensors that accepts input from the user based on haptic and/or tactile contact. Touch screen 19192 and display controller 1956 (along with any associated modules and/or sets of instructions in memory 1902) detect contact (and any movement or breaking of the contact) on touch screen 19192 and converts the detected contact into interaction with user-interface objects (e.g., one or more soft keys, icons, web pages or images) that are displayed on touch screen 19192. In an exemplary embodiment, a point of contact between touch screen 19192 and the user corresponds to a finger of the user.

Touch screen 19192 may use LCD (liquid crystal display) technology, LPD (light emitting polymer display) technology, or LED (light emitting diode) technology, although other display technologies may be used in other embodiments. Touch screen 19192 and display controller 1956 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 19192. In an exemplary embodiment, projected mutual capacitance sensing technology is used, such as that found in the iPhone®, iPod Touch®, and iPad® from Apple Inc. of Cupertino, Calif.

The user may make contact with touch screen 19192 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 1900 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 19192 or an extension of the touch-sensitive surface formed by the touch screen.

Device 1900 also includes power system 1962 for powering the various components. Power system 1962 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1900 may also include one or more optical sensors 1964. FIG. 19 shows an optical sensor coupled to optical sensor controller 195194 in I/O subsystem 1906. Optical sensor 1964 may include charge-coupled device (CCD) or complementary metal-oxide semiconductor (CMOS) phototransistors. Optical sensor 1964 receives light from the environment, projected through one or more lens, and converts the light to data representing an image. In conjunction with imaging module 1943 (also called a camera module), optical sensor 1964 may capture still images or video. In some embodiments, an optical sensor is located on the back of device 1900, opposite touch screen display 19192 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 1900 may also include one or more proximity sensors 1966. FIG. 19 shows proximity sensor 1966 coupled to peripherals interface 19198. Alternately, proximity sensor 1966 may be coupled to input controller 1960 in I/O subsystem 1906. In some embodiments, the proximity sensor turns off and disables touch screen 19192 when the multifunction device is placed near the user's ear (e.g., when the user is making a phone call).

Device 1900 includes one or more orientation sensors 1968. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1900. In some embodiments, the one or more orientation sensors include any combination of orientation/rotation sensors. FIG. 19 shows the one or more orientation sensors 1968 coupled to peripherals interface 19198. Alternately, the one or more orientation sensors 1968 may be coupled to an input controller 1960 in I/O subsystem 1906. In some embodiments, information is displayed on the touch screen display in a portrait view or a landscape view based on an analysis of data received from the one or more orientation sensors.

In some embodiments, the software components stored in memory 1902 include operating system 1926, communication module (or set of instructions) 1928, contact/motion module (or set of instructions) 1930, graphics module (or set of instructions) 1932, text input module (or set of instructions) 1934, Global Positioning System (GPS) module (or set of instructions) 1935, arbiter module 1958 and applications (or sets of instructions) 1936. Device/global internal state 1957 includes one or more of: active application state, indicating which applications, if any, are currently active; display state, indicating what applications, views or other information occupy various regions of touch screen display 19192; sensor state, including information obtained from the device's various sensors and input control devices 19196; state information that indicates which processes control output of shared audio or visual resource of a vehicle; ownership transition conditions of the shared audio or visual resource; and location information concerning the device's location and/or attitude.

Operating system 1926 (e.g., Darwin, LINUX, UNIX, OS X, WINDOWS, or an embedded operating system such as VxWorks or RTXC) includes various software components and/or drivers for controlling and managing general system tasks (e.g., memory management, storage device control, power management, etc.) and facilitates communication between various hardware and software components.

Communication module 1928 facilitates communication with other devices over one or more external ports 1924 and also includes various software components for handling data received by RF circuitry 1908 and/or external port 1924. External port 1924 (e.g., Universal Serial Bus (USB), FIREWIRE, etc.) is adapted for coupling directly to other devices or indirectly over a network (e.g., the Internet, wireless LAN, etc.).

Contact/motion module 1930 may detect contact with touch screen 19192 (in conjunction with display controller 1956) and other touch sensitive devices (e.g., a touchpad or physical click wheel). Contact/motion module 1930 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 1930 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 1930 and display controller 1956 detect contact on a touchpad.

Contact/motion module 1930 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 1932 includes various known software components for rendering and displaying graphics on touch screen 19192 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 1932 stores data representing graphics to be used. Each graphic may be assigned a corresponding code. Graphics module 1932 receives, from applications etc., one or more codes specifying graphics to be displayed along with, if necessary, coordinate data and other graphic property data, and then generates screen image data to output to display controller 1956.

Text input module 1934, which may be a component of graphics module 1932, provides soft keyboards for entering text in various applications (e.g., contacts 1937, e-mail 1940, IM 19419, browser 1947, and any other application that needs text input).

GPS module 1935 determines the location of the device and provides this information for use in various applications (e.g., to telephone 1938 for use in location-based dialing, to camera 1943 as picture/video metadata, and to applications that provide location-based services such as weather widgets, local yellow page widgets, and map/navigation widgets).

Applications 1936 may include the following modules (or sets of instructions), or a subset or superset thereof:
  contacts module 1937 (sometimes called an address book or contact list);
  telephone module 1938;
  video conferencing module 193194;
  e-mail client module 1940;
  instant messaging (IM) module 19419;
  workout support module 1942;
  camera module 1943 for still and/or video images;
  image management module 1944;
  browser module 1947;
  calendar module 1948;
  widget modules 194194, which may include one or more of: weather widget 194194-19, stocks widget 194194-2, calculator widget 194194-3, alarm clock widget 194194-4, dictionary widget 194194-5, and other widgets obtained by the user, as well as user-created widgets 194194-6;
  widget creator module 1950 for making user-created widgets 194194-6;
  search module 19519;
  video and music player module 1952, which may be made up of a video module and a music module;
  notes module 1953;
  map module 1954; and/or
  online video module 1955.

Examples of other applications 1936 that may be stored in memory 1902 include other word processing applications, other image editing applications, drawing applications, presentation applications, JAVA-enabled applications, encryption, digital rights management, voice recognition, and voice replication.

In conjunction with touch screen 19192, display controller 1956, contact module 1930, graphics module 1932, and text input module 1934, contacts module 1937 may be used to manage an address book or contact list (e.g., stored in application internal state 191942 of contacts module 1937 in memory 1902), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 1938, video conference 193194, e-mail 1940, or IM 19419; and so forth.

In conjunction with RF circuitry 1908, audio circuitry 19190, speaker 191919, microphone 19193, touch screen 19192, display controller 1956, contact module 1930, graphics module 1932, and text input module 1934, telephone module 1938 may be used to enter a sequence of characters corresponding to a telephone number, access one or more telephone numbers in address book 1937, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 1908, audio circuitry 19190, speaker 191919, microphone 19193, touch screen

19192, display controller 1956, and communication module 1928, arbiter module 1958 negotiates control of a shared audio or visual resource of an automobile. A request for control of a shared audio or visual resource of the vehicle is received at arbiter module 1958. Arbiter module 1958 maintains existing state information for ownership of the shared audio or visual resource and ownership transition conditions of the shared audio or visual resource. The request for control of the shared audio or visual resource of the vehicle is received from one of a plurality of processes including a process executing on an embedded system attached to the vehicle and a process executing on a mobile computing device (portable multifunction device 1900) temporarily communicating with the vehicle. New state information regarding ownership of the shared audio or visual resource is determined by arbiter module 1958 based at least in part on the request for control and the ownership transition conditions. The new state information indicates which of the processes controls output of the shared audio or visual resource of the vehicle. New ownership transition conditions of the shared audio or visual resource are determined by arbiter module 1958 and communicated to a controller interface of the shared audio or visual resource.

In conjunction with RF circuitry 1908, audio circuitry 19190, speaker 191919, microphone 19193, touch screen 19192, display controller 1956, optical sensor 1964, arbiter module 1958, contact module 1930, graphics module 1932, text input module 1934, contact list 1937, and telephone module 1938, videoconferencing module 193194 includes executable instructions to initiate, conduct, and terminate a video conference between a user and one or more other participants in accordance with user instructions.

In conjunction with RF circuitry 1908, touch screen 19192, display controller 1956, contact module 1930, graphics module 1932, and text input module 1934, e-mail client module 1940 includes executable instructions to create, send, receive, and manage e-mail in response to user instructions. In conjunction with image management module 1944, e-mail client module 1940 makes it very easy to create and send e-mails with still or video images taken with camera module 1943.

In conjunction with RF circuitry 1908, touch screen 19192, display controller 1956, contact module 1930, graphics module 1932, and text input module 1934, the instant messaging module 19419 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 1908, touch screen 19192, display controller 1956, contact module 1930, graphics module 1932, text input module 1934, GPS module 1935, map module 1954, and music player module 1946, workout support module 1942 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 19192, display controller 1956, optical sensor(s) 1964, optical sensor controller 195194, contact module 1930, graphics module 1932, and image management module 1944, camera module 1943 includes executable instructions to capture still images or video (including a video stream) and store them into memory 1902, modify characteristics of a still image or video, or delete a still image or video from memory 1902.

In conjunction with touch screen 19192, display controller 1956, contact module 1930, graphics module 1932, text input module 1934, and camera module 1943, image management module 1944 includes executable instructions to arrange, modify (e.g., edit), or otherwise manipulate, label, delete, present (e.g., in a digital slide show or album), and store still and/or video images.

In conjunction with RF circuitry 1908, touch screen 19192, display system controller 1956, contact module 1930, graphics module 1932, and text input module 1934, browser module 1947 includes executable instructions to browse the Internet in accordance with user instructions, including searching, linking to, receiving, and displaying web pages or portions thereof, as well as attachments and other files linked to web pages.

In conjunction with RF circuitry 1908, touch screen 19192, display system controller 1956, contact module 1930, graphics module 1932, text input module 1934, e-mail client module 1940, and browser module 1947, calendar module 1948 includes executable instructions to create, display, modify, and store calendars and data associated with calendars (e.g., calendar entries, to do lists, etc.) in accordance with user instructions.

In conjunction with RF circuitry 1908, touch screen 19192, display system controller 1956, contact module 1930, graphics module 1932, text input module 1934, and browser module 1947, widget modules 194194 are mini-applications that may be downloaded and used by a user (e.g., weather widget 194194-19, stocks widget 194194-2, calculator widget 1941943, alarm clock widget 194194-4, and dictionary widget 194194-5) or created by the user (e.g., user-created widget 194194-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 1908, touch screen 19192, display system controller 1956, contact module 1930, graphics module 1932, text input module 1934, and browser module 1947, the widget creator module 1950 may be used by a user to create widgets (e.g., turning a user-specified portion of a web page into a widget).

In conjunction with touch screen 19192, display system controller 1956, contact module 1930, graphics module 1932, and text input module 1934, search module 19519 includes executable instructions to search for text, music, sound, image, video, and/or other files in memory 1902 that match one or more search criteria (e.g., one or more user-specified search terms) in accordance with user instructions.

In conjunction with touch screen 19192, display system controller 1956, contact module 1930, graphics module 1932, audio circuitry 19190, speaker 191919, RF circuitry 1908, and browser module 1947, video and music player module 1952 includes executable instructions that allow the user to download and play back recorded music and other sound files stored in one or more file formats, such as MP3 or AAC files, and executable instructions to display, present or otherwise play back videos (e.g., on touch screen 19192 or on an external, connected display via external port 1924). In some embodiments, device 1900 may include the functionality of an MP3 player, such as an iPod (trademark of Apple Inc.).

In conjunction with touch screen 19192, display controller 1956, contact module 1930, graphics module 1932, and text input module 1934, notes module 1953 includes executable instructions to create and manage notes, to do lists, and the like in accordance with user instructions.

In conjunction with RF circuitry 1908, touch screen 19192, display system controller 1956, contact module 1930, graphics module 1932, text input module 1934, GPS module 1935, and browser module 1947, map module 1954 may be used to receive, display, modify, and store maps and data associated with maps (e.g., driving directions; data on stores and other points of interest at or near a particular location; and other location-based data) in accordance with user instructions.

In conjunction with touch screen 19192, display system controller 1956, contact module 1930, graphics module 1932, audio circuitry 19190, speaker 191919, RF circuitry 1908, text input module 1934, e-mail client module 1940, and browser module 1947, online video module 1955 includes instructions that allow the user to access, browse, receive (e.g., by streaming and/or download), play back (e.g., on the touch screen or on an external, connected display via external port 1924), send an e-mail with a link to a particular online video, and otherwise manage online videos in one or more file formats, such as H.264. In some embodiments, instant messaging module 19419, rather than e-mail client module 1940, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 1902 may store a subset of the modules and data structures identified above. Furthermore, memory 1902 may store additional modules and data structures not described above.

In some embodiments, device 1900 is a device where operation of a predefined set of functions on the device is performed exclusively through a touch screen and/or a touchpad. By using a touch screen and/or a touchpad as the primary input control device for operation of device 1900, the number of physical input control devices (such as push buttons, dials, and the like) on device 1900 may be reduced.

The predefined set of functions that may be performed exclusively through a touch screen and/or a touchpad include navigation between user interfaces. In some embodiments, the touchpad, when touched by the user, navigates device 1900 to a main, home, or root menu from any user interface that may be displayed on device 1900. In such embodiments, the touchpad may be referred to as a "menu button." In some other embodiments, the menu button may be a physical push button or other physical input control device instead of a touchpad.

While a portable or mobile computing device is shown as one embodiment of a multifunction device, one of skill in the art will readily realize in light of having read the current disclosure that a desktop computer or other computing device may also perform many of the functions described herein without departing from the scope and intent of the present disclosure. Likewise, while touch screen devices are shown as one embodiment of a multifunction device, one of skill in the art will readily realize in light of having read the current disclosure that a desktop computer or other computing device without a touch screen may also perform many of the functions described herein without departing from the scope and intent of the present disclosure.

Figure 20:
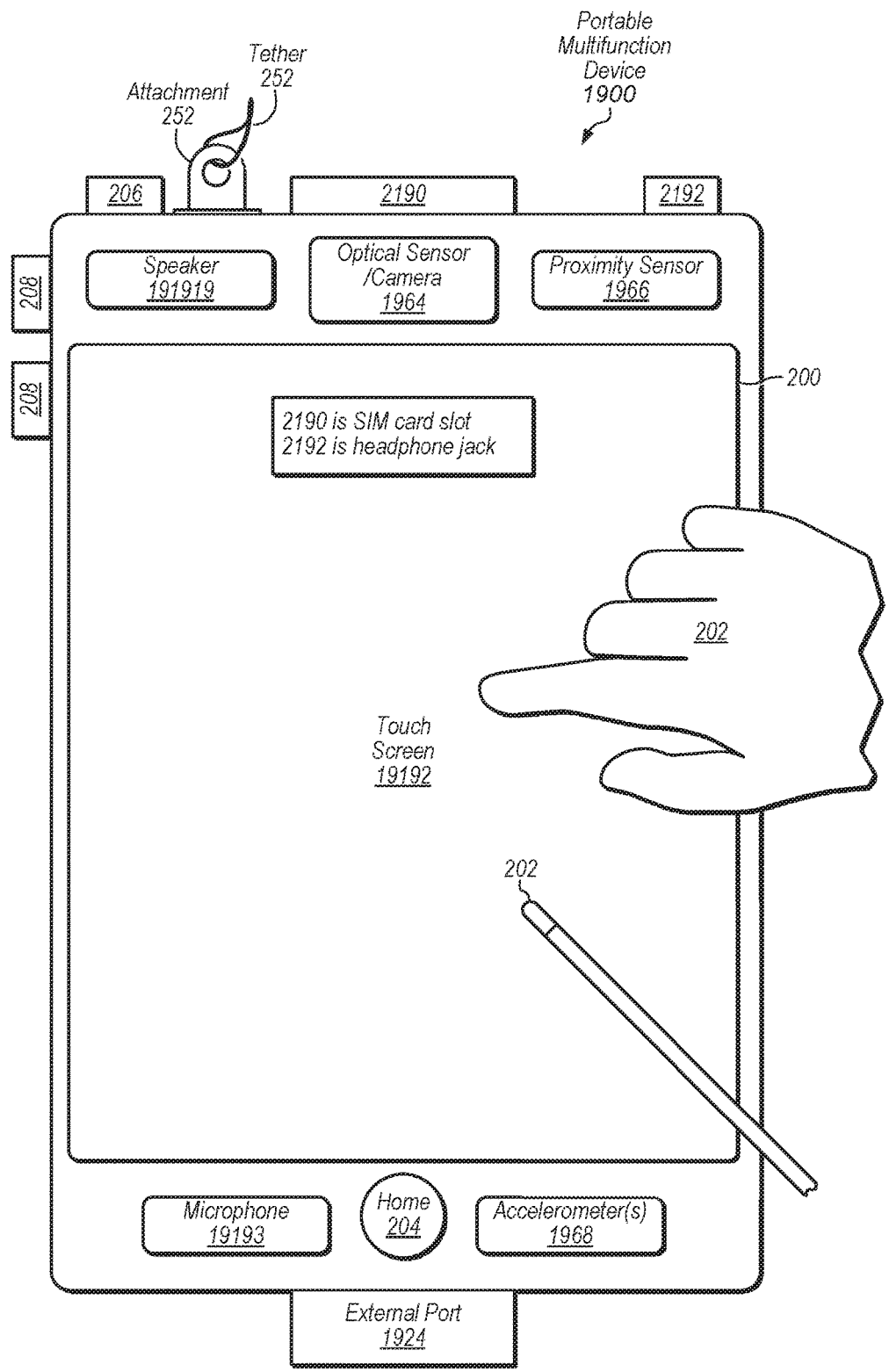
FIG. 20 illustrates a block diagram of a multifunction mobile computing device facilitating automated response to a distress signal, in accordance with some embodiments.

FIG. 20 illustrates a portable multifunction device 1900 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure).

Device 1900 may also include one or more physical buttons, such as "home" or menu button 204. As described previously, menu button 204 may be used to navigate to any application 1936 in a set of applications that may be executed on device 1900. Alternatively, in some embodiments, the menu button is implemented as a soft key in a GUI displayed on touch screen 19192.

In one embodiment, device 1900 includes touch screen 19192, menu button 204, push button 206 for powering the device on/off and locking the device, volume adjustment button(s) 208, Subscriber Identity Module (SIM) card slot 2190, head set jack 2192, and docking/charging external port 1924. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process.

In an alternative embodiment, device 1900 also may accept verbal input for activation or deactivation of some functions through microphone 19193.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A method for facilitating automated response to a distress signal, the method comprising:
   detecting a disarticulation from a sensor location on a multifunction mobile computing device of an attachment removably articulated to the sensor location, wherein
      the sensor location comprises a radio-frequency antenna coupled to a housing of the multifunction mobile computing device,
      the attachment comprises an electronic device having a data connection to the sensor location via a radio-frequency channel between the attachment and the multifunction mobile computing device, and
      the disarticulation comprises an attenuation of the data connection; and
   responsive to the detecting the disarticulation of the attachment from the sensor location on the multifunction mobile computing device, transmitting the distress signal to a distress signal response receiver over a radio-frequency network from a radio-frequency transmitter located within a housing of the multifunction mobile computing device.

2. The method of claim 1, wherein the disarticulation comprises a loss of the data connection.

3. The method of claim 1, further comprising:
   responsive to the detecting the disarticulation of the attachment from the sensor location on the multifunction mobile computing device, capturing input data received from one or more sensors affiliated with the attachment, and
   transmitting to the distress signal response receiver over the radio-frequency network from the radio-frequency transmitter located within the housing of the multifunction mobile computing device the input data received from the one or more sensors affiliated with the attachment.

4. The method of claim 1, further comprising:
   transmitting to the distress signal response receiver over the radio-frequency network from the radio-frequency transmitter located within the housing of the multifunction mobile computing device the distress signal without presenting any visible or audible indication, at the multifunction mobile computing device, of the transmission of the distress signal.

5. The method of claim 1, further comprising:
   responsive to the detecting the disarticulation of the attachment from the sensor location on the multifunction mobile computing device, providing an audible indication, at the attachment, of the transmission of the distress signal.

6. The method of claim 1, further comprising:
   responsive to the detecting the disarticulation of the attachment from the multifunction mobile computing device, providing a vibration, at the attachment, as an indication of the transmission of the di stress signal.

7. The method of claim 1, further comprising:
   responsive to the detecting the disarticulation of the peripheral device from the multifunction mobile computing device, providing a visible light source, at the attachment, as an indication of the transmission of the di stress signal.

8. The method of claim 1, further comprising:
   responsive to the detecting the disarticulation of the attachment from the multifunction mobile computing device,
   presenting a distress signal control interface, at the attachment, capable of receiving an order from a user of the attachment to prevent transmission of the distress signal, and
   responsive to the order from the user of the attachment to prevent transmission of the distress signal, preventing transmission of the distress signal.

9. A system for facilitating automated response to a distress signal, the system comprising:
   a multifunction mobile computing device including a radio-frequency antenna coupled to a housing of the multifunction mobile computing device, and a non-transitory computer readable storage medium;
   a peripheral device for the multifunction mobile computing device having a data connection to the radio-frequency antenna via a radio-frequency channel between the peripheral device and the multifunction mobile computing device, wherein
      the peripheral device removably articulates to the multifunction mobile computing device, and
      the non-transitory computer readable storage medium includes program instructions computer-executable by the multifunction mobile computing device to implement:
   detecting a disarticulation of the peripheral device from the multifunction mobile computing device, the disarticulation comprising an attenuation of the data connection, and
   responsive to the detecting the disarticulation of the peripheral device from the multifunction mobile computing device, transmitting the distress signal to a distress signal response receiver over a radio-frequency network from a radio-frequency transmitter located within a housing of the multifunction mobile computing device.

10. The system of claim 9, wherein the disarticulation comprises a loss of the data connection.

11. The system of claim 9, wherein the program instructions are further computer-executable to implement:
    responsive to the detecting the disarticulation of the peripheral device from the multifunction mobile computing device, capturing input data received from one or more sensors affiliated with the peripheral device, and
    transmitting to the distress signal response receiver over the radio-frequency network from the radio-frequency transmitter located within the housing of the multifunction mobile computing device the input data received from the one or more sensors affiliated with the peripheral device.

12. The system of claim 9, wherein the program instructions are further computer-executable to implement:
    transmitting to the distress signal response receiver over the radio-frequency network from the radio-frequency transmitter located within the housing of the multifunction mobile computing device the distress signal without presenting any visible or audible indication, at the multifunction mobile computing device, of the transmission of the distress signal.

13. The system of claim 9, wherein the program instructions are further computer-executable to implement:
    responsive to the detecting the disarticulation of the peripheral device from the multifunction mobile computing device, providing an audible indication, at the peripheral device, of the transmission of the distress signal.

14. The system of claim 9, wherein the program instructions are further computer-executable to implement:
- responsive to the detecting the disarticulation of the peripheral device from the multifunction mobile computing device, providing a vibration, at the peripheral device, as an indication of the transmission of the distress signal.

15. The system of claim 9, wherein the program instructions are further computer-executable to implement:
- responsive to the detecting the disarticulation of the peripheral device from the multifunction mobile computing device, providing a visible light source, at the peripheral device, as an indication of the transmission of the distress signal.

16. The system of claim 9, wherein the program instructions are further computer executable to implement:
- responsive to the detecting the disarticulation of the peripheral device from the multifunction mobile computing device,
- presenting a distress signal control interface, at the peripheral device, capable of receiving an order from a user of the peripheral device to prevent transmission of the distress signal, and
- responsive to the order from the user of the peripheral device to prevent transmission of the distress signal, preventing transmission of the distress signal.

17. A non-transitory computer-readable storage medium comprising program instructions, wherein the program instructions are executable by one or more processors of a multifunction computing device to cause the multifunction mobile computing device to implement:
- detecting a disarticulation from a sensor location on a multifunction mobile computing device of a peripheral device removably articulated to the sensor location, wherein
  - the sensor location comprises a radio-frequency antenna coupled to a housing of the multifunction mobile computing device,
  - the peripheral device comprises an electronic device having a data connection to the sensor location via a radio-frequency channel between the peripheral device and the multifunction mobile computing device, and
  - the disarticulation comprises an attenuation of the data connection; and
- responsive to the detecting the disarticulation of the peripheral device from the sensor location on the multifunction mobile computing device, transmitting the distress signal to a distress signal response receiver over a radio-frequency network from a radio-frequency transmitter located within a housing of the multifunction mobile computing device.

18. The non-transitory computer-readable storage medium of claim 17, further comprising program instructions executable by the one or more processors of the multifunction mobile computing device to cause the multifunction mobile computing device to implement:
- responsive to the detecting the disarticulation of the peripheral device from the sensor location on the multifunction mobile computing device, capturing input data received from a user interface affiliated with the peripheral device, and
- transmitting to the distress signal response receiver over the radio-frequency network from the radio-frequency transmitter located within the housing of the multifunction mobile computing device the input data received from the user interface affiliated with the peripheral device.

19. The non-transitory computer-readable storage medium of claim 17, wherein the program instructions executable by the one or more processors of the multifunction mobile computing device to cause the multifunction mobile computing device to implement transmitting to a distress signal response receiver over a radio-frequency network from a radio-frequency transmitter located within a housing of the multifunction mobile computing device the distress signal further comprise:
- program instructions executable by the one or more processors of the multifunction mobile computing device to cause the multifunction mobile computing device to implement transmitting to a distress signal response receiver over a radio-frequency network from a radio-frequency transmitter located within a housing of the multifunction mobile computing device the distress signal without presenting any visible or audible indication, at the multifunction mobile computing device, of the transmission of the distress signal.

20. The non-transitory computer-readable storage medium of claim 17, further comprising program instructions executable by the one or more processors of the multifunction mobile computing device to cause the multifunction mobile computing device to implement:
- responsive to the detecting the disarticulation of the peripheral device from the sensor location on the multifunction mobile computing device, providing one or more of an audible, a visual, or a tactile indication of the transmission of the distress signal, at the peripheral device.

* * * * *